(12) United States Patent
Pfeifer et al.

(10) Patent No.: US 9,047,074 B2
(45) Date of Patent: *Jun. 2, 2015

(54) APPARATUS AND METHOD FOR MANAGING POWER CAPACITY IN DATA CENTERS USING A WIRELESS SENSOR NETWORK

(75) Inventors: Ray Pfeifer, Los Gatos, CA (US); Raju Pandey, Davis, CA (US)

(73) Assignee: SynapSense Corporation, Folsom, CA (US)

( * ) Notice: Subject to any disclaimer, the term of this patent is extended or adjusted under 35 U.S.C. 154(b) by 744 days.

This patent is subject to a terminal disclaimer.

(21) Appl. No.: 13/210,185

(22) Filed: Aug. 15, 2011

(65) Prior Publication Data

US 2012/0054527 A1    Mar. 1, 2012

Related U.S. Application Data

(63) Continuation-in-part of application No. 12/807,234, filed on Aug. 30, 2010, now Pat. No. 8,811,377, and a continuation-in-part of application No. 12/890,506, filed on Sep. 24, 2010, now Pat. No. 8,600,575.

(51) Int. Cl.
*H04L 12/26*     (2006.01)
*G06F 1/26*      (2006.01)
*G06F 11/20*     (2006.01)
*H04L 29/08*     (2006.01)
*G06F 11/30*     (2006.01)

(52) U.S. Cl.
CPC ............. *G06F 1/266* (2013.01); *G06F 11/203* (2013.01); *G06F 11/3006* (2013.01); *H04L 67/1034* (2013.01); *G06F 11/3062* (2013.01); *H04L 43/00* (2013.01); *G06F 11/3089* (2013.01)

(58) Field of Classification Search
None
See application file for complete search history.

(56) References Cited

U.S. PATENT DOCUMENTS

| 2006/0164040 | A1 | 7/2006 | Ohkubo |
| 2009/0062970 | A1 | 3/2009 | Forbes et al. |
| 2010/0142425 | A1 | 6/2010 | Lee et al. |
| 2010/0164720 | A1* | 7/2010 | Kore ............................ 340/541 |

(Continued)

OTHER PUBLICATIONS

PCT International Search Report and Written Opinion, Feb. 28, 2012, PCT/US2011/049235.

(Continued)

*Primary Examiner* — Khoa Huynh
(74) *Attorney, Agent, or Firm* — Inventive Patent Law P.C.; Jim H. Salter

(57) ABSTRACT

Various embodiments for managing power capacity in a facility include: a plurality of wireless sensor devices deployed in a facility, each wireless sensor device to monitor electrical power usage of at least one of a plurality of electrical devices in the facility; periodically obtaining system power data from each of the wireless sensor devices, the system power data including electrical power usage data corresponding to associated electrical devices, the system power data being received from the wireless sensor devices via a wireless sensor network; using the system power data to determine the electrical loading levels of each of the electrical devices; identifying at least one lightly loaded electrical device based on the determined electrical loading levels; dynamically commanding the identified lightly loaded electrical device to migrate its workload to another one of the electrical devices; and dynamically commanding the identified lightly loaded electrical device to deactivate.

18 Claims, 14 Drawing Sheets

(56) References Cited

U.S. PATENT DOCUMENTS

2011/0096659 A1* 4/2011 Cardona et al. ............... 370/220
2011/0218689 A1* 9/2011 Chan et al. .................... 700/295

OTHER PUBLICATIONS

PCT International Search Report, International Appl. No. PCT/US2011/049235, Mar. 5, 2013.

* cited by examiner

APPARATUS AND METHOD FOR MANAGING POWER CAPACITY IN DATA CENTERS USING A WIRELESS SENSOR NETWORK

PRIORITY APPLICATIONS

This is a continuation-in-part patent application of patent application Ser. No. 12/807,234; filed Aug. 30, 2010 now U.S. Pat. Ser. No. 8,811,377; and Ser. No. 12/890,506; filed Sep. 24, 2010 now U.S. Pat. Ser. No. 8,600,575 by the same applicant. This present patent application draws priority from the referenced co-pending patent applications. The entire disclosures of the referenced co-pending patent applications are considered part of the disclosure of the present application and are hereby incorporated by reference herein in their entirety.

TECHNICAL FIELD

The disclosed subject matter relates to the field of device monitoring and control, and more particularly to power management of electronic devices.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2011 SynapSense Corporation, All Rights Reserved.

BACKGROUND

A data center can be modeled as rows of racks that house electronic systems, such as computing systems or other types of electrical devices. The computing systems (such as computers, storage devices, servers, routers, networking devices, etc.) consume power for their operation. The computing systems of the data center may reside in these racks. In a typical data center, there may be dozens or even hundreds of electrical devices. Each of these devices is connected to an electrical power source.

Data centers consume significant amounts of power, much of which is wasted in transmission and distribution, overcooling, and idle servers. Various studies have shown that about 35 W (watts) of electricity goes toward 1 W of actual work. In order to effectively utilize power in data centers and to ultimately reduce the overall power usage, it is critical to first measure how different data center equipment (e.g., servers, routers, storage equipment, cooling unit and power distribution units) consume power, and then to use the consumption information to optimize power usage.

The problem of measuring power consumption in data centers is complex for several reasons. First, the number of devices that consume power can be very large. Any solution will need to be cost effective and will need to apply to large as well as small data centers. Second, data centers use a variety of devices and mechanisms to deliver power. Any solution will need to address the heterogeneity and legacy issues in the data center. Finally, a large number of devices or systems in data centers can be idle or outdated. Some mechanism is needed to enable data center operators to remotely manage data center equipment and the power consumption of data center equipment.

In some cases, data center operators have responded by installing Smart power strips, power distribution strips, or Rack Power Distribution Units (RPDUs) that can measure power at the rack or at the plug level. Some of these RPDUs can use the Internet Protocol (IP) network to transfer this information. Unfortunately, the networking capabilities of many of the conventional RPDUs are not utilized because of the cost and complexity of connecting them to the IP network.

Power in data centers is typically distributed from Uninterruptable Power Systems (UPS) to servers from Power Distribution Units (PDUs) that transform the voltage from 480 VAC to 208/110 VAC to internal electrical distribution panel boards or external power panel boards. The panel boards contain individual electrical circuits of various current or amperage capacities. These electrical power circuits are connected to power distribution strips containing electrical outlets in equipment racks placed on the data center floor to plug the individual servers to meet their power needs.

The power distribution topology provided in the data center may be single path or non-redundant with only one set of UPS. PDUs are installed to provide power to the servers with a single power supply and one plug connection. The topology may also be dual path or redundant whereby multiple UPS systems and two sets of PDUs are installed to provide power from two different electrical systems to each server, which is designed with redundant power supplies that are powered independently from two rack power distribution units or strips (RPDUs). In another data center electrical topology, a primary UPS of a redundant set of UPS systems feeds single PDUs through static transfer switches (STS). If the primary UPS fails, the STS automatically switches the PDU to the alternate back-up source UPS of the redundant set of UPS systems.

Each server's maximum power requirement at full load is required to be provided to the outlet plug in either a single or dual path topology. To meet this requirement each power distribution strip is fed from a PDU electrical circuit that may vary in voltage and power capacity as required by the information technology (IT) equipment to be housed in each equipment rack.

The number and type of servers that may be housed in a specific equipment rack is bound by how much electrical load can be put on each circuit (known as circuit capacity), which typically is between 20-100 amps per circuit. Power is fed from the PDU through the power distribution panel and through a circuit breaker, which is a device that enables a safe means of turning off power being fed from the PDU to the rack power strips for installation and maintenance purposes and to protect the electrical power distribution system from overloading and damage if the server load connected to the circuit exceeds its rated maximum capacity.

New servers are typically assigned to specific racks and circuits based upon the estimated maximum server power requirement and the installed provisioned maximum rated capacity of the circuit breaker.

The typical approach used is as follows:
Look at server faceplate ratings connected to or proposed to be connected to an individual rack power strip, add them up and use this value to see if additional servers can be added to a existing power circuit or to determine the capacity of the circuit breaker that needs to be used.
Another typical method is to consult the server manufacturer's published average usage for the particular server types to be housed in the equipment rack, add them up, and add a safety margin of 20-30% for possible peak usage.

The problems with both of these approaches are as follows:

Faceplate ratings are based upon the maximum power draw of the server with its maximum resource configuration including central processing units (CPUs) or cores, memory and storage. This maximum power draw is much higher than the typical configuration used in the data center.

The commonly used safety cushion of 20-30% may also be too high or too low depending upon actual peak utilization that is based upon varying application work load demand and diversity factors depending upon what workloads are assigned to the servers housed in the rack.

In both cases, decisions about available capacity may be too conservative or not conservative enough and lead to wasted capacity or unplanned power outages if the installed servers require more power than the installed capacity or in fail-over modes where the sum of the power drawn on the two PDUs is more than the installed UPS capacity.

As a result of these problems with conventional data center power management systems, the cost of owning and operating a data center can be significantly affected. The implications to the total cost of ownership and operation of the data center can include:

Some available conditioned UPS power is wasted. This wasted power can be expensive.

Reconfiguration of servers in racks may force movement of other servers to other racks or the requirement to statically power cap the servers, which provides a predictable maximum power draw but reduces their performance at peak CPU utilization. In other words, statically determined available capacity does not respond well to changes in server configuration or workload utilization.

Equipment refresh with more energy efficient and significantly more powerful servers, especially for currently operating applications further increases wasted power capacity and lowers average server utilization levels.

BRIEF DESCRIPTION OF THE DRAWINGS

The various embodiments are illustrated by way of example, and not by way of limitation, in the figures of the accompanying drawings in which.

DETAILED DESCRIPTION

In the following detailed description, a reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for managing power capacity in data centers using a wireless sensor network. A particular embodiment relates to a network of radio frequency (RF) devices (wireless nodes) that can include one or more sensing devices capable of sensing various system and environmental conditions. In addition, the wireless nodes can gather power usage/consumption information from RPDUs, which can be connected to the wireless node via an Ethernet or serial (e.g., wired) data connection. Then, using wireless data communications, the wireless nodes can communicate sensor information, system condition information including power consumption information, or network information with other nodes of the wireless sensor network or with a set of network controllers (e.g., gateways). The network and node configuration in a particular embodiment are described in more detail below.

The system and method of a particular embodiment involves deploying wireless sensor devices for collecting system information, including power consumption information, at different locations and levels in a data center or facility, and then using the system information to manage the capacity and consumption of electrical power within the data center. Additionally, wired sensor devices or other sources of system data can be deployed for collecting system information, including power consumption information, which can be communicated along with the data from the wireless sensor devices to an analysis processor for management of capacity and consumption of electrical power within the data center.

Wireless mesh network technology can be used for deploying sensors as wireless nodes in a variety of different environments for monitoring diverse parameters such as, for example, power consumption or power usage, temperature, pressure, humidity, airflow/fluid flow, the presence of moisture, the presence of smoke or fire, electrical current, power, air quality, air particle count, and the like. These types of networks can be denoted wireless sensor networks (WSN). Each sensor in a WSN can be powered by a battery and therefore capable of operating in a wireless configuration. As described in more detail below, the sensors can constantly monitor a system and/or the environment for various system conditions and may communicate with other nodes and/or a network controller or gateway.

Figure 1:
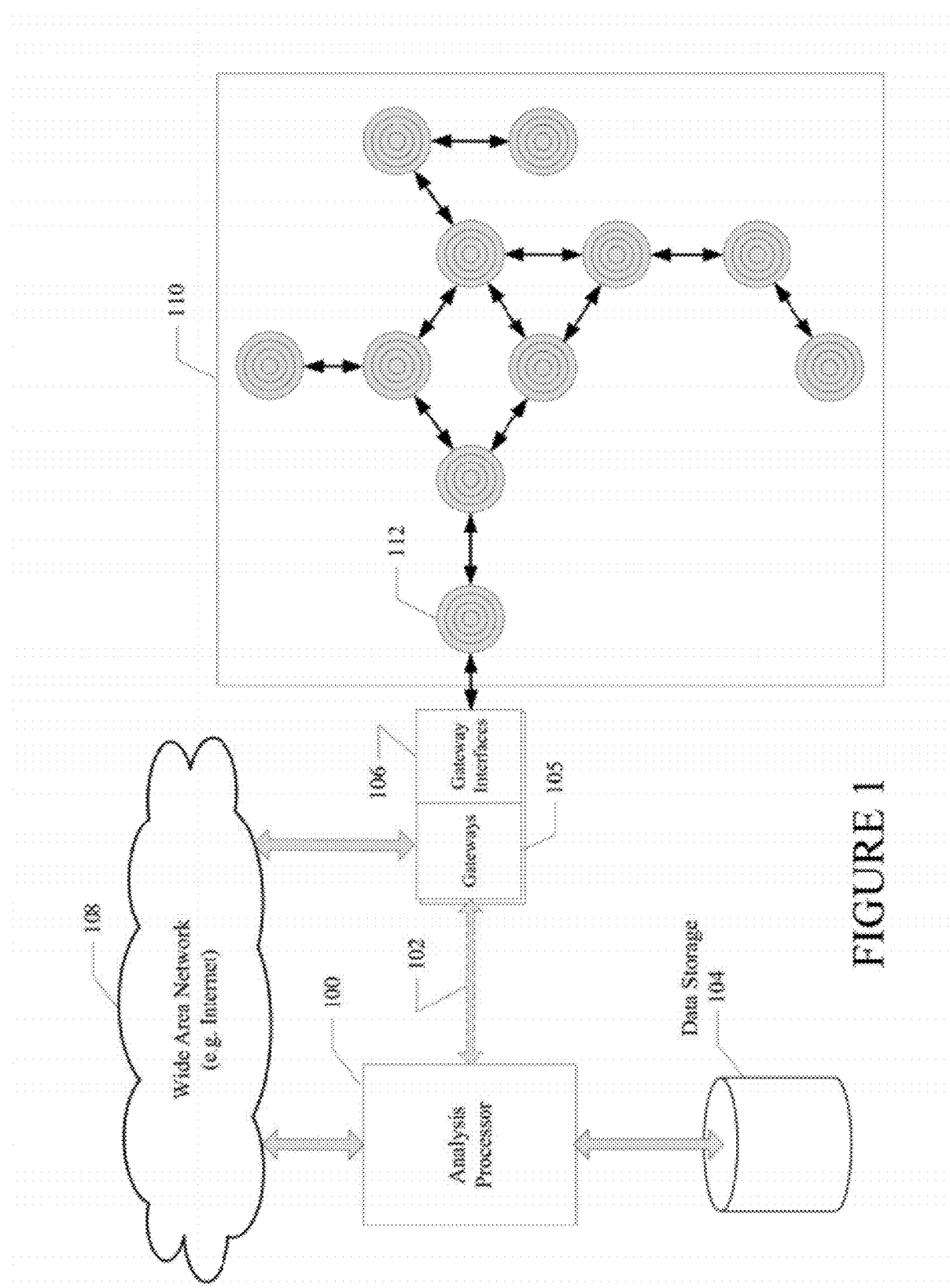
FIG. 1 illustrates a mesh network environment in which various embodiments can operate.
Figure 2:
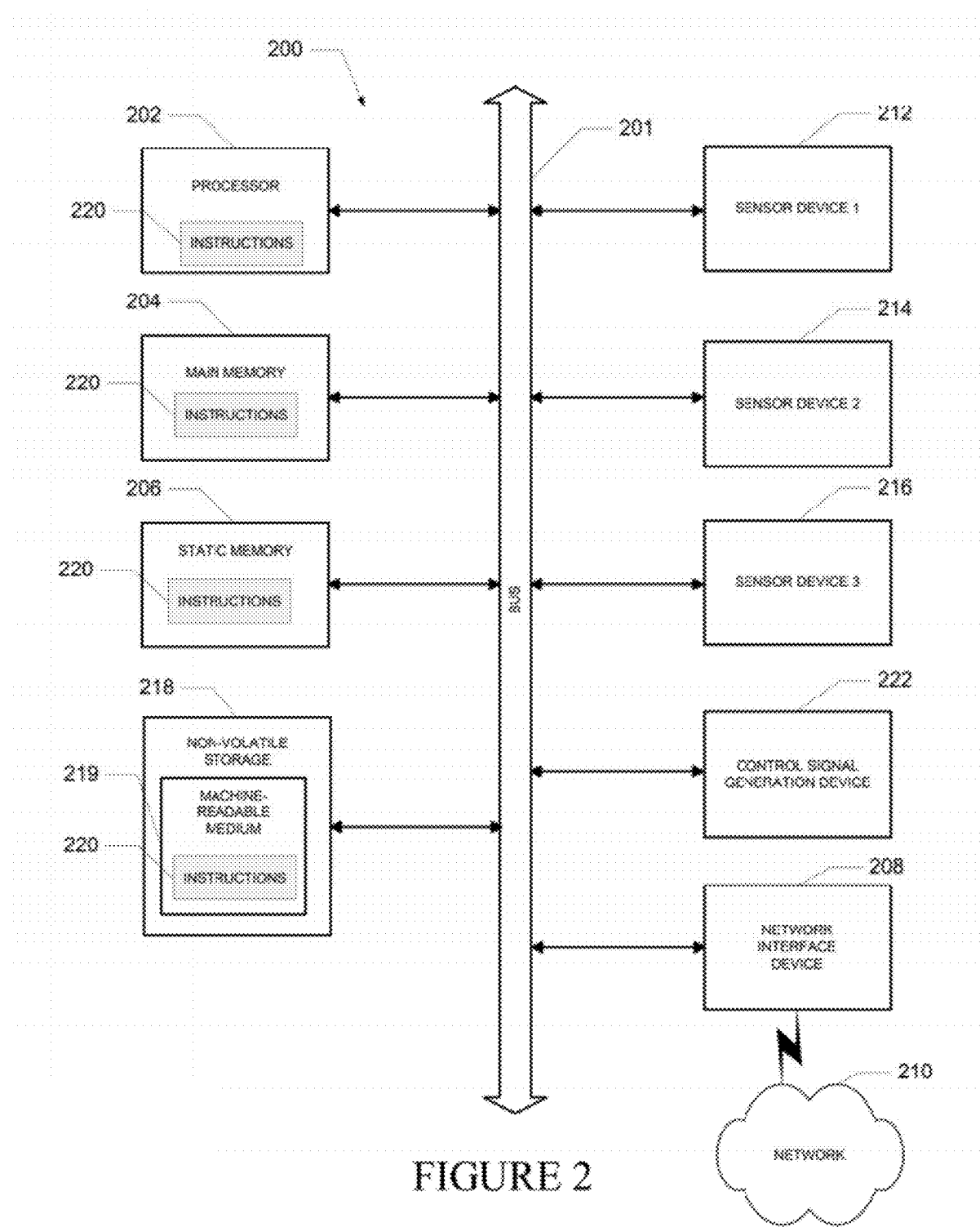
FIG. 2 illustrates an example embodiment of a node that can operate in a mesh network.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 (nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are shown in FIG. 2.

Referring still to FIG. 1, data packets or messages can be directed between any two nodes of the WSN 110 as each node 112 has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a set of gateways 105 via a gateway interface 106. The gateway 105 provides a connection between the WSN 110 and an analysis processor 100. Analysis processor 100 can be used to receive sensor data from any of the nodes 112 of WSN 110 via gateway 105 and wide-area network 108 and to analyze the sensor data for aggregated system monitoring and control. Gateway 105 and analysis processor 100 can also each provide a connection to a wide-area network 108, such as the Internet. In this manner, the analysis processor 100, the gateway 105, and the WSN 110 can obtain access to the Internet. Gateway 105 and analysis processor 100 can use a conventional data storage device 104 for data storage and retrieval. In some embodiments, an internal data connection 102 can be provided to link Gateway 105 and analysis processor 100 for data communications.

The WSN 110 can be configured in any of a variety of ways. Nodes 112 can be added, removed, or moved within the array of nodes of WSN 110. Each of the nodes 112 include functionality to join or reconfigure themselves in the WSN 110 when a node is added or moved. As part of this functionality, each node 112 can discover its neighbor nodes and automatically negotiate and establish communication paths with those neighbors. A node can be in direct data communication with neighbors that are within the radio reception range of the node. Depending on the strength of the wireless transceivers (e.g., radios) within each node 112, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include power consumption or power usage sensors, voltage measurement devices, electrical current measurement devices, wattage measurement devices, inductance measurement devices, electromagnetic field (EMF) measurement devices, temperature sensors, humidity sensors, air pressure sensors, air flow sensors, moisture detectors, carbon monoxide detectors, fire/smoke detectors, motion detectors, seismic detectors, electrical current sensors, power sensors, air quality sensors, air particle count sensors, magnetic anomaly sensors, and/or other types of sensors for detecting and measuring a desired system or environmental condition.

The node 200 may further include a non-volatile memory 218, a control signal generation device 222, and a network interface device 208 (e.g., a radio transceiver or wireless device capable of connection with a network). The non-volatile memory 218 includes a machine-readable medium 219 in which is stored one or more sets of instructions (e.g., software and data 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute non-transitory machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of a management system, such as a power management system, electrical control unit, a heating/ventilating/air conditioning (HVAC) system, a fan, a heat pump, or other device or system that can alter the power consumption or environmental conditions being monitored by sensors 212, 214, and 216.

Gateway 105 can provide synchronization timing for the nodes 112 of WSN 110. Gateway 105 can send periodic messages to each of the nodes 112 of WSN 110. These periodic messages can include a timing signal (e.g. a beacon) to which each of the nodes 112 can synchronize their internal timers. Similarly, messages from gateway 105 to each of the nodes 112 can be used to provide system status, configuration, and control settings for the nodes of WSN 110.

As described herein, an apparatus and method for managing power capacity in data centers using a wireless sensor network is disclosed. The apparatus and method in a particular embodiment include using a network of wireless sensors to monitor various system conditions, including power consumption, in specific devices of a data center over time and to generate control signals to manage power capacity and consumption and related conditions. Additionally, wired sensor devices (WSDs) or other sources of system data can be deployed for collecting system information, including power consumption information, which can be communicated along with the data from the wireless sensor devices to an analysis processor for management of capacity and consumption of electrical power within a data center. Particular example embodiments are described in more detail below.

Figure 3:
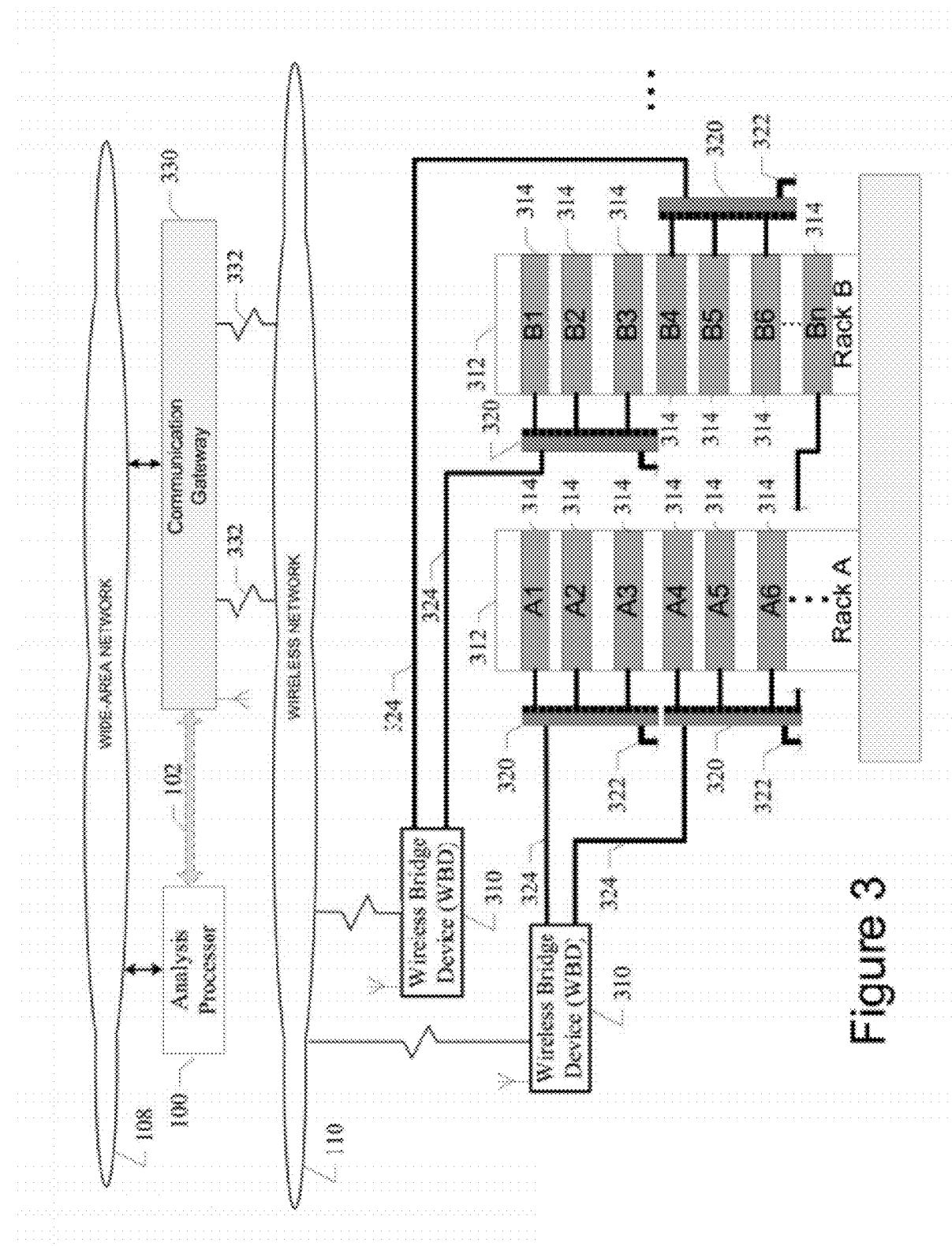
FIGS. 3 and 4 illustrate sample data center configurations of particular embodiments that include a set of racks that support stacked sets of electronic equipment, the power consumption of the electronic equipment being monitored by RPDUs, which communicate with a wireless bridge device via a wired data connection, the wireless bridge device being in wireless mesh network communication with a communication gateway.

Referring now to FIG. 3, various example embodiments of the disclosed subject matter provide an apparatus and method for cost effective and efficient measuring of power usage (including current, voltage, power, power factor, energy, etc.) of different kinds of electrical equipment in a facility (e.g., a data center). In a particular embodiment, the system includes two sets of devices: (a) RPDUs 320, and (b) Wireless bridge devices (WBD) 310. An RPDU 320 (also denoted a power distribution unit (PDU) herein) includes a series of electrical outlets or jacks for distributing electrical power for a plurality of electrical or electronic devices 314 in a rack 312 of electrical equipment. The RPDU 320 is connected to an electrical power source via electrical cable 322. The RPDU 320 also includes power measurement circuitry for sampling and measuring the electrical power consumed by electrical devices 314 connected to each of the electrical outlets. The RPDU 320 includes circuitry for converting the sampled electrical power consumption measurements into power consumption data, which can be transferred to a wireless bridge device (WBD) 310 via a data line 324. In example embodiments, the data line 324 can be an Ethernet connection or a conductor for transferring serial data to WBD 310. Conventional RPDU devices are available. For example, various types of power strips or power distribution units are available from SynapSense Corp., ServerTech, Emerson (Knuerr), Raritan, Eaton, APC, Hewlett Packard, CyberPower and other manufacturers and distributors. Wireless bridge devices (WBD) 310, such as those described herein, are not commercially or otherwise available from third parties.

The Wireless bridge device (WBD) 310 can include a low cost microprocessor, a wireless radio, interfaces to one or more RPDUs 320, and additional circuitry, as described below in connection with FIG. 6. In a particular embodiment, each RPDU 320 is connected to a plurality of electrical devices 314 in racks 312. Each RPDU 320 is also connected to an electrical power source via power cable or cord 322. Upon connection, the RPDU 320 measures the electrical power consumed by each device 314 to which the RPDU 320 is connected. As shown in the example of FIG. 3, RPDU 320 devices measure the power usage of electric or electronic devices (e.g., servers) A1 through A6 and B1 through Bn of racks A and B 312. Each RPDU 320 measures the electrical power consumed by each device 314 to which the RPDU 320 is connected and reports this power consumption information as system data to a set of wireless bridge devices (WBD) 310. In one embodiment, the RPDUs 320 can transfer the power consumption data to the WBDs 310 via a wired connection, such as an Ethernet or serial data connection 324. The WBD 310 can aggregate this system data and report the system data, including power consumption data, to a gateway 330 in wireless network data transmissions 332 via wireless network 110. The gateway 330 can then report the system data to an analysis processor 100 via a wide-area network 108 or via an internal data connection 102 in a particular embodiment.

FIG. 3 illustrates a data center configuration of a particular embodiment that includes a set of racks 312 that support stacked sets of electronic equipment 314. In the illustrated example, wireless sensor devices can be installed at various points proximate to racks 312. The wireless sensor devices can be implemented as the devices illustrated in FIG. 2 and described above. As described above in connection with FIGS. 1 and 2, the wireless sensor devices are wirelessly networked together in a wireless network 110 (an example of which is shown in FIG. 1) and in data communications with gateway 330, analysis processor 100, and wide-area network 108. The WBDs 310 can also be implemented as wireless sensor devices, which include the capability to interface with the RPDUs 320 as described herein. As such, the WBDs 310 can be considered wireless sensor devices and nodes in the wireless network 110. Each of the wireless sensor devices, including WBDs 310, can be configured to sense various system conditions, such as environmental conditions. In addition, the WBDs 310 can receive power usage/consumption information (including current, voltage, power, power factor, energy, etc.) and the like from the RPDUs 320. At a predetermined and configurable time interval, wireless sensor devices can measure the system conditions at each sensor location and retain the system data measurements along with a timestamp associated with each system data measurement. Using the wireless data network 110, the wireless sensor devices can transmit time-stamped system data along with a sensor identifier to the analysis processor 100 for processing. The time-stamped system data can be sent to the analysis processor 100 via a pathway of nodes in wireless network 110, gateway 330, and wide-area network 108. In this manner, the analysis processor 100 can collect the time-stamped system data from each of the wireless sensor devices installed in racks 312. It will be understood by those of ordinary skill in the art upon reading this patent disclosure that an arbitrary number of wireless sensor devices can be installed in the racks 312 in arbitrary positions within each rack of a particular data center. In general, the greater number of wireless sensor devices increases the ability for the system to detect more subtle changes in the system conditions within the data center. The analysis processor 100 can use the system data to control operation of the plurality of electronic devices 314 in the facility.

Referring still to FIG. 3, each WBD 310 can receive power consumption data from one or more RPDUs 320. The WBD 310 can then use the multi-hop mesh network (such as wireless network 110) to send the data to the analysis processor 100 via gateway 330 for data processing. In a particular embodiment, RPDUs 320 and wireless bridge devices (WBD) 310 cooperate in the following way to measure and communicate power usage information.

Each RPDU 320 is capable of sampling electrical power usage/consumption data at a plurality of power outlets or jacks to which electrical devices 314 are connected. After sampling the data, the RPDU 320 can convert the sampled measurements to power capacity/usage/consumption data, generally denoted system data, which can be locally stored and/or transferred via a data connection 324 (e.g., a wired data connection). In this manner, the RPDU 320 can perform among the following power measurements and system data generation. In an example embodiment, the RPDU 320 can:
- Measure power at each server plug load;
- Measure instantaneous power (watts);
- Measure and store the highest (max) and lowest (min) power (watts);
- Measure and store volts per phase, current per phase and power factor;
- Calculate an average power (watts), peak power (watts), low power (watts), average volts per phase, average current per phase, and average power factor; and
- Aggregate these metrics over time t, where t is configurable.

The RPDU 320 may locally store the measured and/or calculated power capacity/usage/consumption data, generally denoted system data, in long-term data storage on the RPDU 320 device itself. Periodically, the RPDU 320 can send the measured and converted system data to the WBD 310 to which the RPDU 320 is connected. Alternatively, the WBD 310 can poll the RPDU 320 for the power usage/consumption data. In one embodiment, a primary WBD 310 can be the WBD 310 associated with the rack 312 in which the monitored devices 314 are installed. In other embodiments, the primary WBD 310 can be the WBD 310 associated with a particular one of the plurality of RPDUs 320 at system initialization time. The primary WBD 310 can collect system data from a plurality of associated RPDUs 320. The primary WBD 310 can also collect system data wirelessly from a plurality of other WBDs 310. The primary WBD 310 can aggregate the system data and use a multi-hop mesh network (such as wireless network 110) to send the system data to the analysis processor 100 via gateway 330 for data processing.

Figure 4:
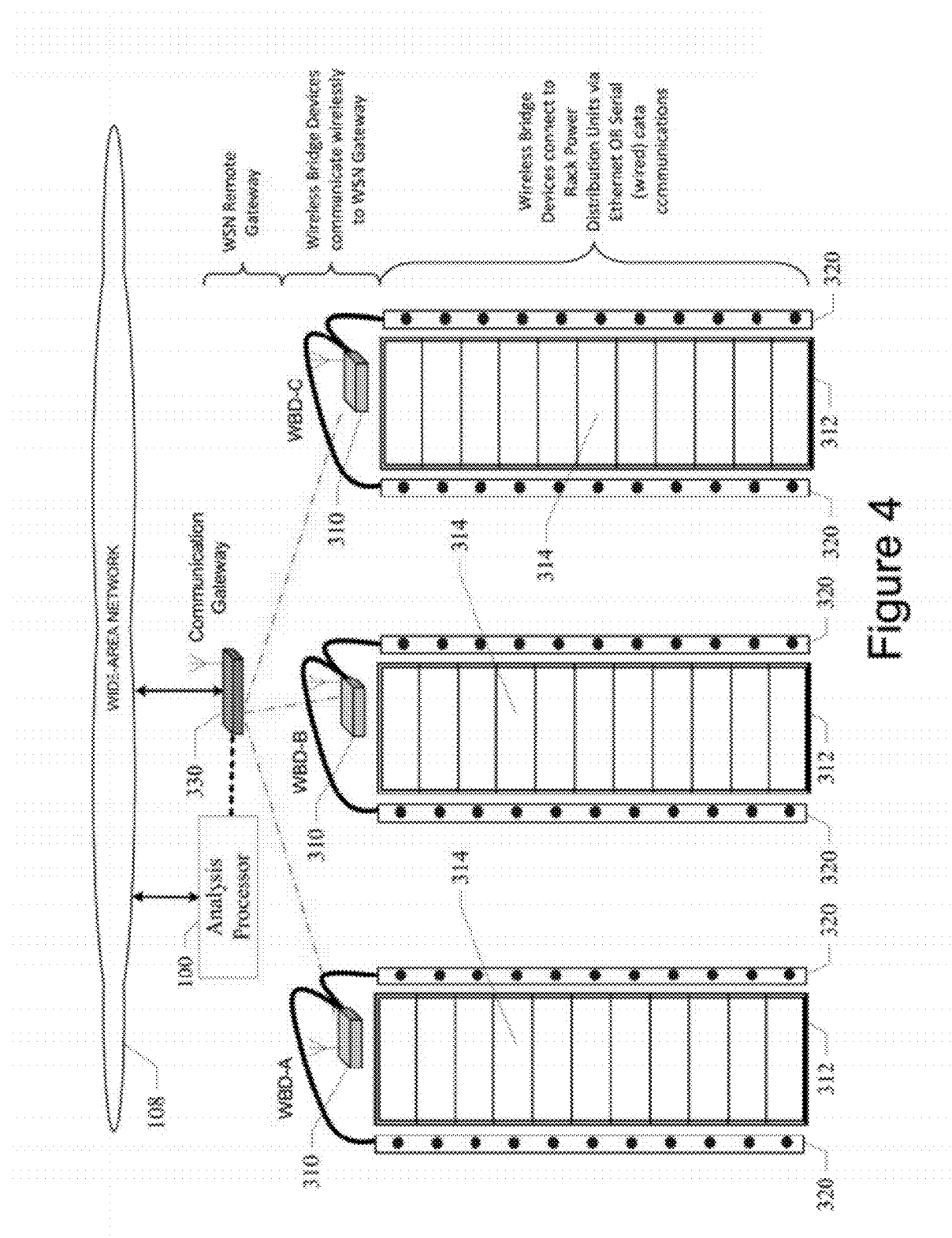

Referring now to FIG. 4, a data center configuration of another embodiment includes a set of racks 312 that support stacked sets of electronic equipment 314. In the illustrated example, RPDUs 320 have been installed with power outlets or jacks for each of the electronic devices 314 residing in racks 312. The RPDUs 320 are each coupled between an electrical power source via electrical cable 322 and a corresponding set of the electronic devices 314. As described above, each WBD 310 can receive system data, including power consumption data, from one or more RPDUs 320. The WBD 310 can then use the multi-hop mesh network (such as wireless network 110) to send the data to the analysis processor 100 via gateway 330 and wide-area network 108 for data processing.

Figure 5:
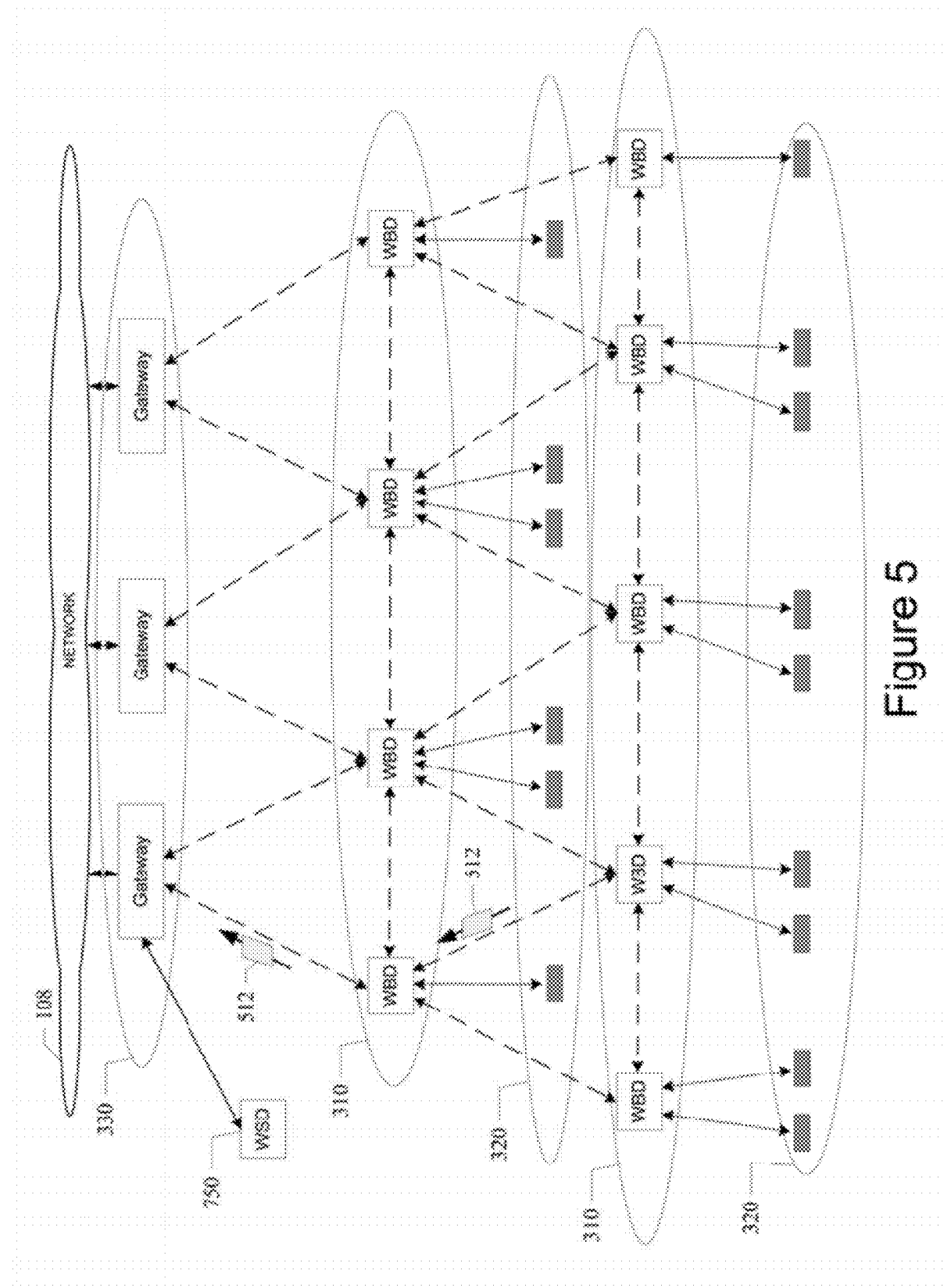
FIG. 5 illustrates a layout of an example data center in which an array of RPDUs and wireless bridge devices have been deployed.

Referring now to FIG. 5, a particular embodiment uses a multi-tier communication architecture for collecting and distributing information. As shown in FIG. 5, there can be two networks: a local network (represented in FIG. 5 with dotted lines between RPDUs 320 and wireless bridge devices (WBD) 310); and a global network (represented in FIG. 5 with dashed lines between wireless bridge devices (WBD) 310 and gateways 330). In a particular embodiment, the local network consists of a set of RPDUs 320 and an associated primary WBD 310. The local network is managed by the primary WBD 310. The primary WBD 310 is responsible for initiating, synchronizing, scheduling, and managing data communication in the local network. As shown in FIG. 5, data transfer in the local network takes place between an RPDU 320 and the primary WBD 310. As shown in FIG. 5, for example, the RPDUs 320 form a local communication network with the primary WBD 310 to which the RPDUs 320 are connected. The primary WBD 3102 manages the local network. Similarly, other collections of RPDUs 320 form local networks with their corresponding primary WBD 310.

In a particular embodiment, the global network is a multi-hop mesh network that integrates a plurality of wireless bridge devices (WBD) 310 with one or more gateways 330. An example embodiment is shown in FIG. 5. The global network is used to distribute system data that is collected by the RPDUs 320 or other wireless sensor devices that may be in wireless data communication with the wireless bridge devices (WBD) 310. As shown in FIG. 5, a plurality of wireless bridge devices (WBD) 310 forms a global network with one or more gateways 330. The global network is used to transfer system information to the gateways 330 and the analysis processor 100 in a multi-tiered communication architecture.

In an example embodiment, such as the example embodiment shown in FIG. 5, data transfer between network nodes (e.g., the wireless bridge devices (WBD) 310 and gateways 330) takes place in two general phases: a data collection phase and a data aggregation phase. In the data collection phase, the WBDs 310 collect power related information (system data) periodically from the electronic devices 314 via the RPDUs 320 to which the electronic devices 314 are connected. The RPDUs 320 may be able to aggregate some of this system data locally. At pre-configured intervals or upon request from another network device, the RPDUs 320 can send the aggregated system data to their primary WBD 310. In the data aggregation phase, the wireless bridge devices (WBD) 310 can collect aggregated system data from a plurality of RPDUs 320. The wireless bridge devices (WBD) 310 can aggregate the collected system data. At pre-configured intervals or upon request from another network device, the wireless bridge devices (WBD) 310 can send the collected system data to the gateway 330 using the global network described above. An example of the routing of the system data is shown in FIG. 5 as a routing of a network data message 512 through the local and global networks as described herein.

FIG. 5 illustrates a layout of an example data center in which an example array of RPDUs 320 has been deployed. A typical deployment can include an array of networked devices (including wireless bridge devices (WBD) 310 and gateways 330) in a distributed network architecture. In a particular example embodiment, the system described herein can include several kinds of devices, including wireless sensor devices, RPDUs 320, wireless bridge devices (WBD) 310, gateways 330, routers, controllers, and the like that are distributed in the data center. FIG. 5 illustrates such an example system. Gateways 330 can connect the RPDUs 320 to a wide-area network 108, such as an Internet Protocol (IP) network including the Internet, via wireless bridge devices (WBD) 310. Gateways 330 typically have communication paths to all sensing and control devices in a particular system. Gateways 330 can send commands, status information, or data center relevant information to the other network devices (e.g., WBDs 320).

In a particular embodiment, an example system can include a centralized software system, called the Analysis Processor 100 (shown in FIG. 1), which stores all of the sensing, control, and status information that is forwarded to the gateways 330 by the other system devices (310 and 320). The Analysis Processor 100 is primarily a repository of information and system-wide data processing for the system. In some embodiments, the Analysis Processor 100 can also control the electronic devices 314 in a particular facility in order to affect the overall power consumption of the facility. The wireless bridge devices (WBD) 310 and gateways 330, denoted generally herein as the network devices, cooperate to establish a mesh data communications network that provides connectivity among the network devices.

In an alternative embodiment as shown in FIG. 5, wired sensor devices (WSDs) 750 or other sources of system data can also be deployed with the RPDUs 320 for collecting system information, including power consumption information, which can be communicated along with the data from the wireless sensor devices via gateways 330 to an analysis processor 100 for management of capacity and consumption of electrical power within a data center.

Figure 6:
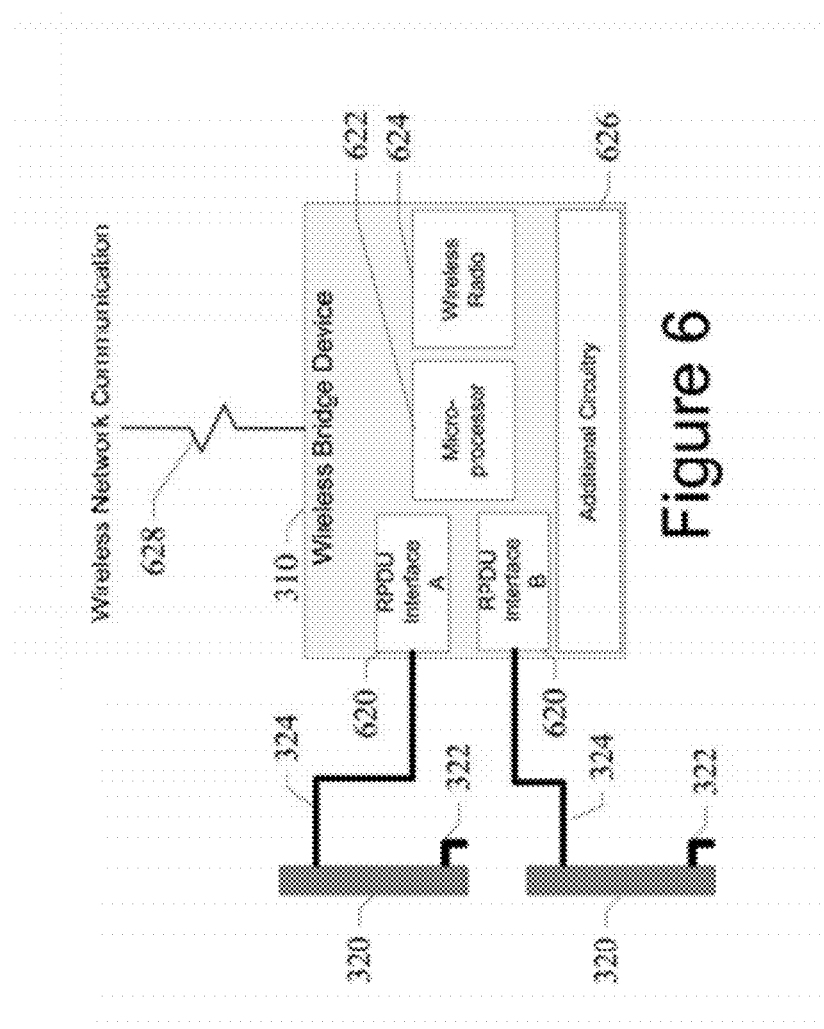
FIG. 6 illustrates an example embodiment of a wireless bridge device that can operate in a mesh network of various embodiments.

FIG. 6 illustrates an example embodiment of a wireless bridge device (WBD) 310 that can operate in a wireless sensor network of various embodiments. In a typical data center, electronic devices 314 (e.g., servers) residing in racks 312 are typically powered via electrical power cords or cables that attach to the electronic device 314 on one side and to an RPDU or Power Distribution Unit (PDU) 320 on another side. As described above, the RPDU 320 of an example embodiment is connected to an electrical power source via electrical cable 322. The RPDU 320 also includes power measurement circuitry for sampling and measuring the electrical power consumed by electrical devices 314 connected to each of the electrical outlets of the RPDU 320. The RPDU 320 includes circuitry for converting the sampled electrical power consumption measurements into power consumption data, which can be transferred to the wireless bridge device (WBD) 310 via a data line 324. In example embodiments, the data line 324 can be an Ethernet connection or a conductor for transferring serial data to WBD 310.

Referring to FIG. 6, a WBD 310 of an example embodiment is shown to include one or more RPDU interfaces or Power Distribution Unit (PDU) interfaces 620, one or more low cost microprocessors 622, a wireless radio 624, and additional circuitry 626. A WBD 310 can be connected to an RPDU 320 via data line 324 and RPDU interface 620. Upon connection, the RPDU 320 uses its power measurement circuitry to measure the electrical power consumed by the electronic devices 314 to which the RPDU 320 is connected. The electrical power usage/consumption data can be retained in a memory of the RPDU 320 and ultimately sent from the RPDU 320 to the WBD 310.

In one example embodiment, the WBD 310 includes two microprocessors 622: one to run an IP network stack, and another microprocessor 622 to run a 15.4 network stack. The WBD 310 includes a wireless radio 624 and one or more RPDU interfaces 620 for connecting with RPDUs 320. Additional circuitry 626 can also be provided for storing processed power usage/consumption data or for sensing other environmental conditions in a manner similar to a wireless sensor device as described above. Additional circuitry 626 can also be provided for sensing various system or. environmental conditions from the WBD 310. The RPDU interfaces 620 of the WBD 310 can also include a number of serial and/or IP ports, which can be used to connect the WBD 310 with a number of RPDUs 320. As shown in the particular embodiment of FIG. 7, the WBD 310 is connected with two RPDUs 320 via data connections 324. In general, a WBD 310 can be connected with several RPDUs 320, limited primarily by the number of ports available on a particular WBD 310. In another embodiment, WBD 310 can be connected with one or more RPDUs 320 via a wireless data link.

Figure 7:
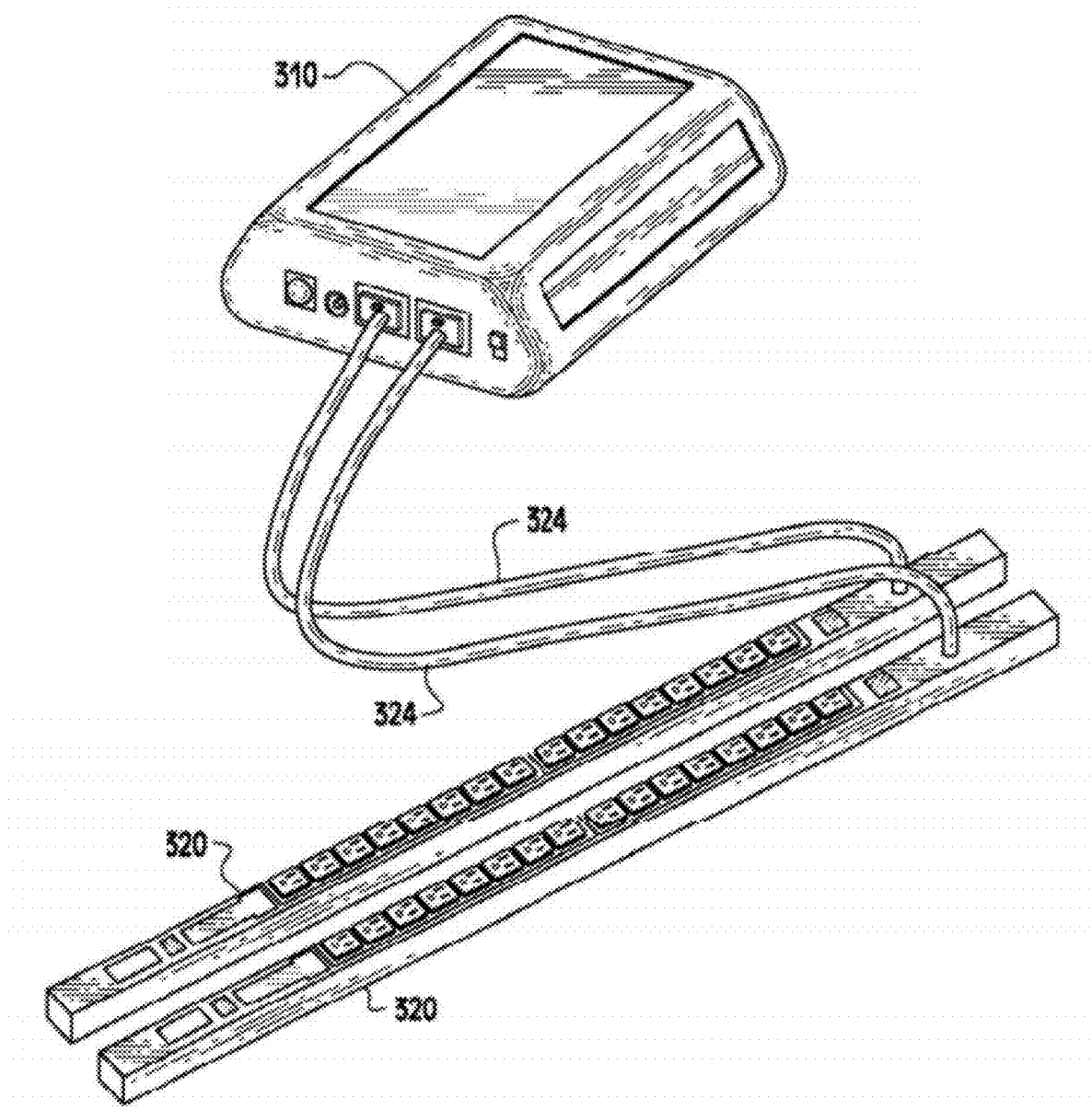
FIG. 7 illustrates a wireless bridge device in an example embodiment.

Referring again to the particular embodiment of FIG. 7, the electronics that implement the processing and radio functions of the WBD 310 can be housed in a Poly Carbonate-acrylonitrile butadiene styrene (PC-ABS) plastic module. Each WBD 310 has a unique identifier (ID) that is provided during manufacturing that is embedded electronically and is bar-coded on the outside of the device. As described above, each WBD 310 includes one or more RPDU interfaces or Power Distribution Unit (PDU) interfaces 620, one or more low cost microprocessors 622, a wireless radio 624, and additional circuitry 626. The wireless radio 624 of a particular embodiment contains a 2.4 GHz ISM band transceiver and an embedded microcontroller 622. The network stack and data management firmware is housed in and executed by the microcontroller 622. An internal antenna supports the wireless radio 624. An on-board battery or a separate power cord and external 24 VDC power adapter can provide power for the electronics of the WBD 310.

In one embodiment, the hardware architecture of the WBD 310 includes several serial and IP ports associated with an embedded IP microprocessor. The IP microprocessor manages the interconnection with RPDUs 320. Each WBD 310 can also contain a microprocessor for wireless network processing and a radio 624 that is used to form a mesh wireless network and to transfer the collected power usage/consumption data from the RPDUs 320. In particular embodiments, RPDUs 320 generally provide two interfaces for transferring power usage/consumption data: Ethernet ports that provide Simple Network Management Protocol (SNMP) or Web access, and RS232 serial ports that provide access to registers that contain the required data. Each WBD 310 can have one or more RS232 serial ports (provided via interfaces 620); each port can be attached to an RPDU 320 as data center racks often have two power strips for each rack. The data rates are generally around 19200 bps and higher. The WBD 310 can auto baud to adapt to the configured data rate of the RPDU 320. In cases where DC power is supplied via the serial port, a WBD 310 can derive power from the RPDU 320. Each WBD 310 can also include one or more Ethernet ports (provided via interfaces 620). Each port can be attached to IP ports on the RPDUs 320. The firmware on the WBD 310 can use SNMP or Web Services protocols to connect with each RPDU 320, and collect information. Upon connection, the WBD 310 can discover the characteristics of the RPDU 320, and can use communication protocols (such as SNMP) to collect data from the RPDU 320. Each WBD 310 can also provide an environmental, sensing harness interface to allow an optional environmental sensing capability.

In an example embodiment, a WBD 310 manages the local communication network that includes a set of RPDUs 320. In addition, the WBD 310 collects power data from the RPDUs 320 and uses the global network to transmit the information to a centralized location for storage and processing. Each WBD 310 can periodically poll the associated RPDUs 320 and collect power and status data (system data) from them. The WBD 310 can aggregate the collected information and assemble the system data into network data packets. The WBD 310 can then send the data packets using the mesh network 110 to a central server (e.g., analysis processor 100) where the system data can be processed. The WBD 310 may also receive a command from a central server (e.g., analysis processor 100). The WBD 310 can then use the identity of a particular RPDU 320 to identify the specific RPDU 320 and forward the command to the specific RPDU 320. In this manner, the analysis processor 100 can control a specific RPDU 320 via the WBD 310 and the wireless network 110.

Wireless bridge devices (WBD) 310 can have a display to show current status and may allow parameters to be selected during the installation process. Push buttons can be provided to set the mode of operation and provide installation functions.

Before the WBD 310 and its associated RPDUs 320 can be used, they need to be configured. Configuration involves associating a specific WBD 310 with a set of RPDUs 320, and the outlet/equipment/rack to which a particular RPDU 320 is attached. A configuration tool is used to record and store this information. In one embodiment, the configuration process involves three distinct steps: (i) Identification, (ii) WBD 310 and RPDU 320 association, and (iii) RPDU 320 discovery. These three phases of the configuration process in an example embodiment are described in more detail below.

Identification involves collecting the identifier associated with each RPDU 320 and storing the identifier with the configuration tool. This can be achieved in one of the several ways: 1) manually associate a rack number with each RPDU 320. Also, associate a unique RPDU identifier with each RPDU 320. Store the rack number and the unique RPDU identifier in the configuration tool; or 2) the configuration tool can include a bar code scanner, which is used to scan the bar code associated with each RPDU 320 and the corresponding rack.

The identification phase can also include among the following configuration operations: (i) associate each RPDU 320 with a server or other IT device that the RPDU 320 is monitoring, (ii) associate the RPDU 320 with the power source to which the RPDU 320 is plugged, (iii) associate the RPDU 320 with the particular power circuit by which the RPDU 320 is fed, and (iv) associate the RPDU 320 with the internal electrical distribution panel board or external power panel board (power distribution panel) by which the RPDU 320 is fed.

Association involves creating a relation between an RPDU 320 and a WBD 310. Every RPDU 320 needs to be associated with a WBD 310. This association is used to determine which RPDU 320 is used to measure power of which rack or collection of electric devices 314. The process involves associating a unique identifier of the RPDU 320 with the unique identifier of the WBD 310. A configuration tool (e.g., a software application) can be used for this process. This association can take place in one of the several ways in an example embodiment: 1) the configuration tool records the unique identifier of the RPDU 320, the unique identifier of the WBD 310, port type (serial or IP), and port number on which the RPDU 320 is attached; or 2) the configuration tool uses absolute location information or relative location information of the RPDU 320 to associate the RPDU 320 with the corresponding WBD 310.

The discovery process in an example embodiment involves a WBD 310 learning the meta-information (or Management Information Base (MIB) in SNMP terminology) associated with an RPDU 320. The meta-information is used to receive data from or send commands to the RPDU 320. The discovery can take place in one of the several ways: 1) each WBD 310 is pre-loaded with meta-information about a wide variety of RPDUs 320. During the association process, the configuration tool specifies the manufacturer of the particular RPDU 320. The manufacturer information is then downloaded into each WBD 310 using the mesh network 110. The WBD 310 uses this information to select meta-information specific to the particular RPDU 320, and then uses the selected meta-information to interact with the particular RPDU 320; 2) the configuration tool is used to identify the manufacturer information associated with each RPDU 320. The configuration tool then uses the association between a specific RPDU 320 and a corresponding WBD 310 to determine the kind of meta-information that will be needed by the WBD 310. The configuration tool then uses the mesh network 110 to download specific meta-information into the WBD 310; or 3) each WBD 310 stores a pattern of possible meta-information for a variety of RPDUs 320. The WBD 310 periodically probes each RPDU 320 by sending commands, and examining the results. Based on the results, the WBD 310 learns the meta-information about each RPDU 320. The process here can be completely automated.

Wireless Smart Plug (WSP) Devices

Figure 8:
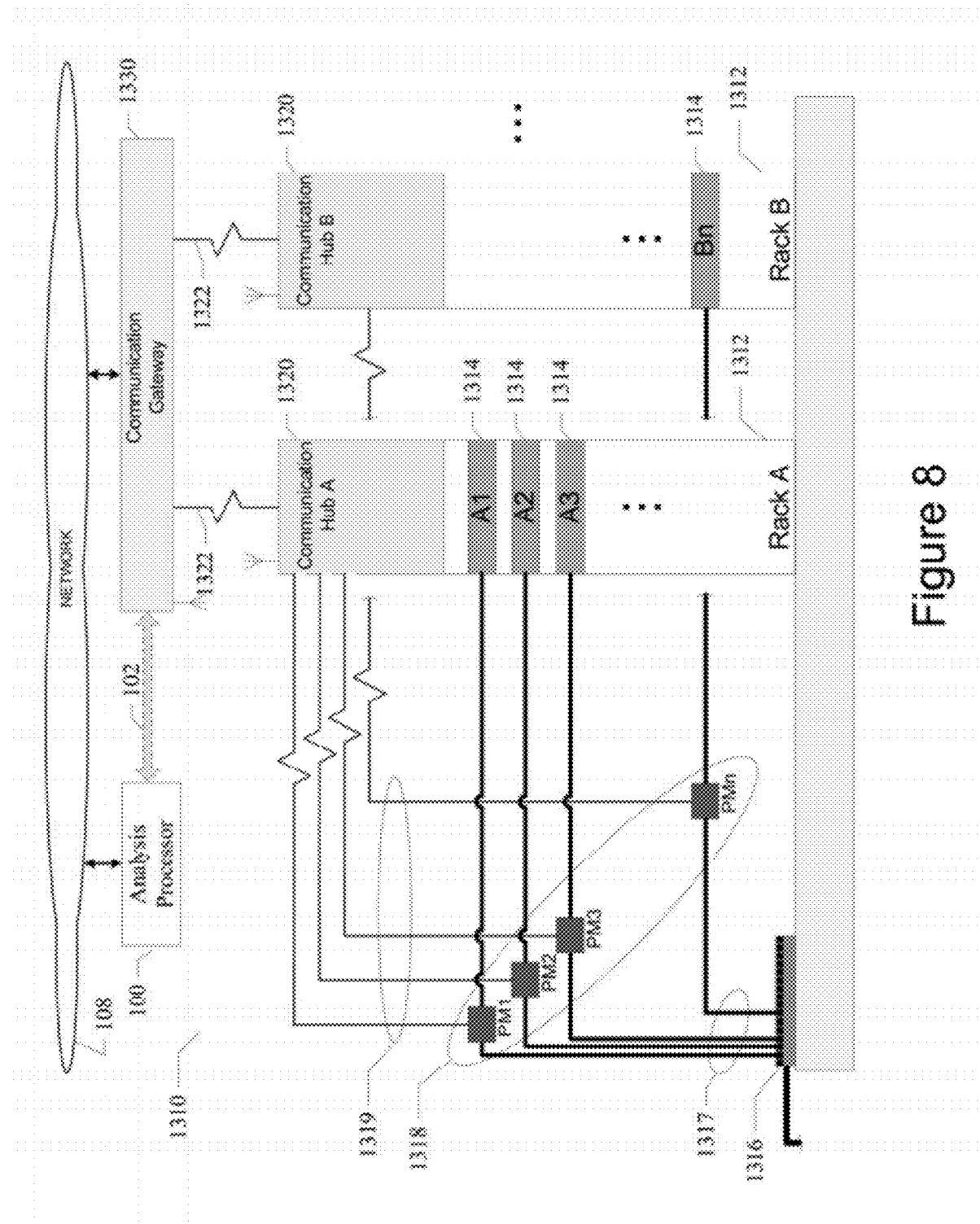
FIGS. 8 and 9 illustrate sample data center configurations of particular embodiments that include a set of racks that support stacked sets of electronic equipment, the power consumption of the electronic equipment being monitored and controlled by power monitors in mesh network communication with communication hubs and a communication gateway.

In an alternative embodiment, a data center can be monitored and controlled using a plurality of wireless smart plug devices instead of RPDUs. Referring now to FIG. 8, a particular embodiment includes two sets of devices: (a) Power Monitors 1318, and (b) Communication Hubs 1320. A power monitor 1318 (also denoted a Smart Plug (SP) herein) includes power measurement circuitry, a low cost microprocessor, a wireless radio and additional circuitry, as described below in connection with FIG. 11. Each power monitor 1318 is connected to a different one of the electrical devices 1314 and to a power strip 1316 or other electrical power source via power cords 1317. Upon connection, the power monitor 1318 measures the electrical power consumed by the device 1314 to which the power monitor 1318 is connected. As shown in the example of FIG. 8, power monitor 1318 devices PM1, PM2, PM3, and PMn, respectively, measure the power usage of electric devices (e.g., servers) A1, A2, A3, and Bn. Each power monitor 1318 measures the electrical power consumed by the device 1314 to which the power monitor 1318 is connected and reports this power information as system data to a set of communication hubs 1320 in wireless network data transmissions 1319. The communication hub 1320 can aggregate this system data and report the system data, including power consumption data, to a gateway 1330 in wireless network data transmissions 1322. The gateway 1330 can then report the system data to an analysis processor 100 via a wide-area network 108 or via an internal data connection 102 in a particular embodiment.

FIG. 8 illustrates a data center configuration 1310 of a particular embodiment that includes a set of racks 1312 that support stacked sets of electronic equipment 1314. In the illustrated example, wireless sensor devices 1318 have been installed at various points proximate to racks 1312. The wireless sensor devices 1318 can be implemented as the devices illustrated in FIG. 2 and described above. As described above in connection with FIGS. 1 and 2, the wireless sensor devices 1318 are wirelessly networked together in a network 110 (an example of which is shown in FIG. 1) and in data communications with a communication hub 1320, gateway 1330, and an analysis processor 100. Each of the sensors 1318 can be configured to sense various system conditions, such as power usage (including current, power, power factor, energy, etc.) and the like. At a predetermined and configurable time interval, sensors 1318 can measure the system conditions at each sensor location and retain the system data measurements along with a timestamp associated with each system data measurement. Using the data network 110, the sensors 1318 can transmit time-stamped system data along with a sensor identifier to the analysis processor 100 for processing. The time-stamped system data can be sent to the analysis processor 100 via communication hub 1320, gateway 1330, and network 108. In this manner, the analysis processor 100 can collect the time-stamped system data from each of the sensors 1318 installed in racks 1312. It will be understood by those of ordinary skill in the art upon reading this patent disclosure that an arbitrary number of sensors 1318 can be installed in the racks 1312 in arbitrary positions within each rack of a particular data center. In general, the greater number of sensors 1318 increases the ability for the system to detect more subtle changes in the system conditions within the data center as described in detail herein. The analysis processor 100 can use the system data to control operation of the plurality of electronic devices 1314 in the facility.

Referring still to FIG. 8, each communication hub device 1320 can receive data wirelessly from a number of power monitors 1318. The communication hub 1320 can then use a multi-hop mesh network (such as network 110) to send the data to the analysis processor 100 via gateway 1330 for data processing. In a particular embodiment, power monitors 1318 and communication hubs 1320 cooperate in the following way to measure and communicate power usage information.

Each power monitor 1318 is capable of sampling power usage data at a very high rate. After sampling the data, the power monitor 1318 can perform computations to calculate different power related metrics. The power monitor 1318 may also store the measured data and calculated metrics, generally denoted system data, in long-term data storage on the power monitor 1318 device itself. Periodically, the power monitor 1318 can send the calculated and measured system data to its primary communication hub 1320. In one embodiment, the primary communication hub 1320 can be the communication hub 1320 associated with the rack 1312 in which the monitored device 1314 is installed. In other embodiments, the primary communication hub 1320 can be the communication hub 1320 associated with a particular one of the plurality of power monitors 1318 at system initialization time. The primary communication hub 1320 can collect data wirelessly from a plurality of associated power monitors 1318. The communication hub 1320 can aggregate the system data and use a multi-hop mesh network (such as network 110) to send the data to the analysis processor 100 via gateway 1330 for data processing.

As shown in the example of FIG. 8, power monitors 1318 (PM1, PM2, and PM3) measure power consumed by servers 1314 (A1, A2, and A3 in Rack A), respectively. Power monitors 1318 (PM1, PM2, and PM3) can then forward the measured power consumption information as system information to a primary communication hub 1320 (e.g., Hub A). Similarly, power monitor 1318 (PMn) can measure power consumed by server 1314 (Bn in Rack B). Power monitor 1318 (PMn) can then forward the measured power consumption information as system information to a primary communication hub 1320 (e.g., Hub B).

Figure 9:
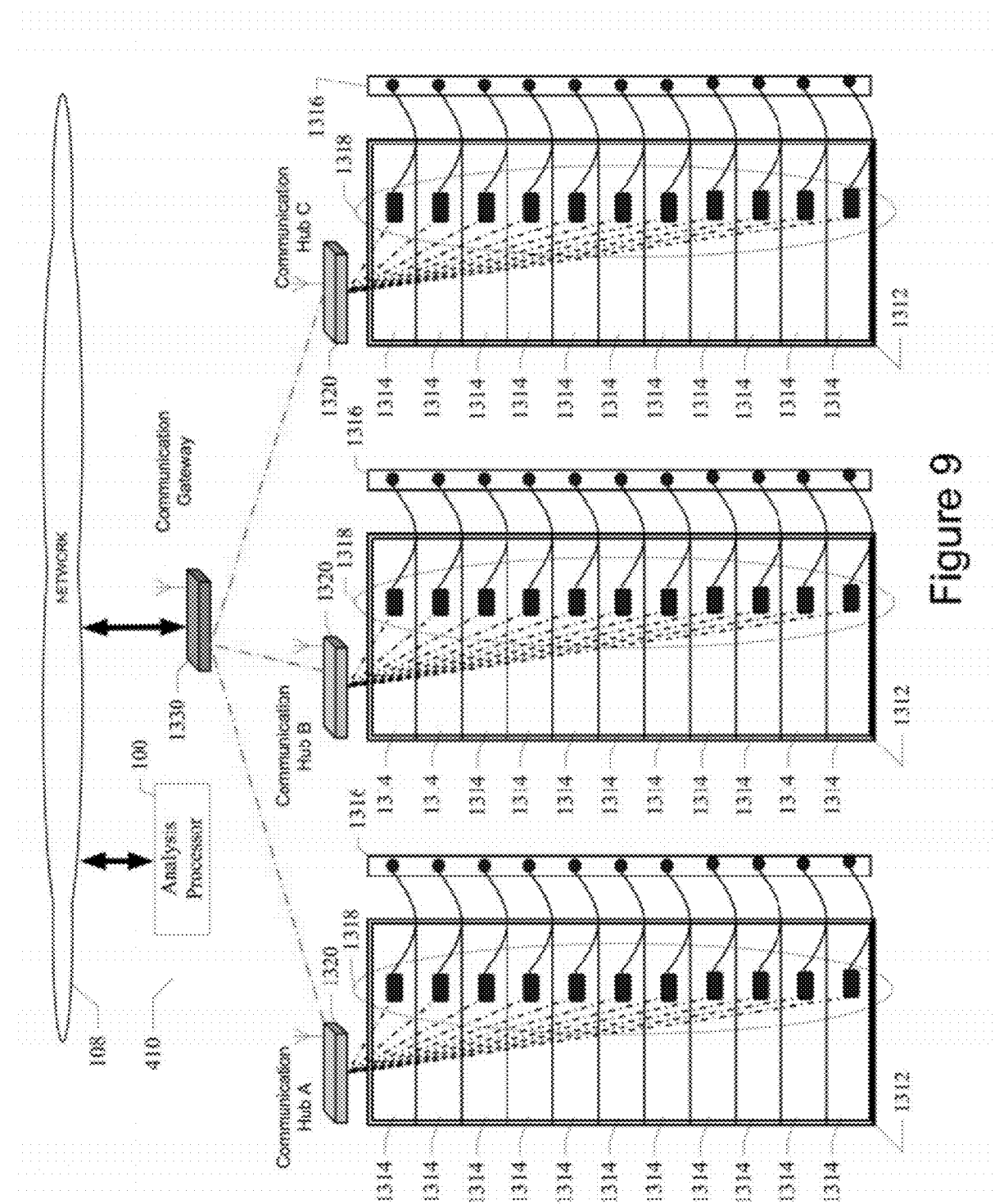

Referring now to FIG. 9, a data center configuration 410 of another embodiment includes a set of racks 1312 that support stacked sets of electronic equipment 1314. In the illustrated example, power monitors 1318 have been installed with each of the electronic devices 1314 residing in racks 1312. The power monitors 1318 are each coupled between a power source (e.g., an electrical power strip) 1316 and a corresponding one of the electronic devices 1314. As described above, each communication hub device 1320 can receive system data, including power consumption data, wirelessly from a plurality of power monitors 1318. The communication hub 1320 can then use a multi-hop mesh network (such as network 110) to send the data to the analysis processor 100 via gateway 1330 and network 108 for data processing.

Figure 10:
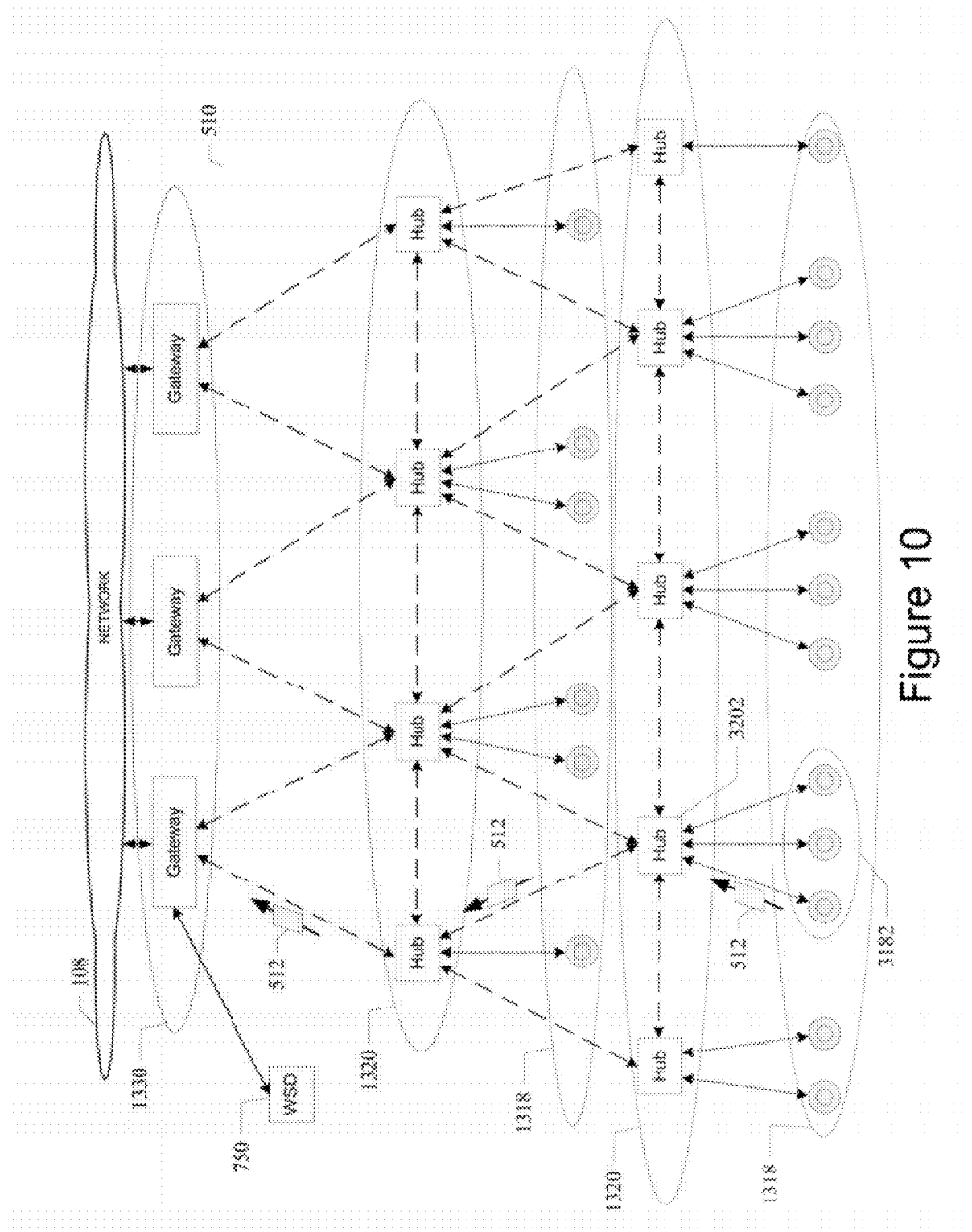
FIG. 10 illustrates a layout of an example data center in which an array of power monitors has been deployed.

Referring now to FIG. 10, a particular embodiment uses a multi-tier communication architecture for collecting and distributing information. As shown in FIG. 10, there are two networks: a local network (represented in FIG. 10 with dotted lines between sensor nodes 1318 and communication hubs 1320); and a global network (represented in FIG. 10 with dashed lines between communication hubs 1320 and gateways 1330). In a particular embodiment, the local network consists of a set of power monitors 1318 and an associated primary communication hub 1320. The local network is managed by the primary communication hub 1320. The primary communication hub 1320 is responsible for initiating, synchronizing, scheduling, and managing data communication in the local network. As shown in FIG. 10, data transfer in the local network takes place between power monitors 1318 and the primary communication hub 1320. As shown in FIG. 10, for example, power monitors 3182 form a local communication network with primary communication hub 3202. The primary communication hub 3202 manages the local network. Similarly, other collections of power monitors 1318 form local networks with their corresponding primary communication hub 1320.

In a particular embodiment, the global network is a multi-hop mesh network that integrates a plurality of communication hubs 1320 with one or more gateways 1330. An example embodiment is shown in FIG. 10. The global network is used to distribute system data that is collected by the power monitors 1318 or other sensors that may be attached to the communication hubs 1320. As shown in FIG. 10, a plurality of communication hubs 1320 forms a global network with one or more gateways 1330. The global network is used to transfer system information to the gateways 1330 in a multi-tiered communication architecture.

In an example embodiment, such as the example embodiment shown in FIG. 10, data transfer between network nodes (e.g., the power monitors 1318, communication hubs 1320, and gateways 1330) takes place in two general phases: a data collection phase and a data aggregation phase. In the data collection phase, the power monitors 1318 collect power related information (system data) periodically from the electronic devices 1314 to which the power monitors 1318 are connected. The power monitors 1318 can aggregate this system data locally. At pre-configured intervals or upon request from another network device, the power monitors 1318 can send the aggregated system data to their primary communication hub 1320. In the data aggregation phase, the communication hubs 1320 can collect aggregated system data from a plurality of power monitors 1318. The communication hubs 1320 can aggregate the collected system data. At pre-configured intervals or upon request from another network device, the communication hubs 1320 can send the collected system data to the gateway 1330 using the global network described above. An example of the routing of the system data is shown in FIG. 10 as a routing of a network data message 512 through the local and global networks as described herein.

FIG. 10 illustrates a layout of an example data center 510 in which an example array of power monitors 1318 has been deployed. A typical deployment can include an array of networked devices (including power monitors 1318, communication hubs 1320, and gateways 1330) in a distributed network architecture. In a particular example embodiment, the system described herein can include several kinds of devices, including wireless sensors, power monitors 1318, communication hubs 1320, gateways 1330, routers, controllers, and the like that are distributed in the data center 510. FIG. 10 illustrates such an example system. Gateways 1330 connect the power monitors 1318 to a wide-area network 108, such as an Internet Protocol (IP) network including the Internet, via communication hubs 1320. Gateways 1330 typically have communication paths to all sensing and control devices in a particular system. Gateways 1330 can send commands, status information, or data center relevant information to the other network devices (1318 and 1320).

In an alternative embodiment as shown in FIG. 10, wired sensor devices (WSDs) 750 or other sources of system data can also be deployed with the power monitors 1318 for collecting system information, including power consumption information, which can be communicated along with the data from the wireless sensor devices via gateways 1330 to an analysis processor 100 for management of capacity and consumption of electrical power within a data center.

In an example embodiment, a communication hub 1320 manages the local communication network that includes a set of power monitors 1318. In addition, the communication hub 1320 collects power data from the power monitors 1318 and uses the global network to transmit the information to a centralized location for storage and processing. Communication hubs 1320 can have a display to show current per phase and allow outlets to be selected during the installation process. Push buttons can be provided to set the mode of operation and provide installation functions. A serial port can be provided to attach a bar-code scanner during the installation process. The hardware architecture of a particular embodiment of the communication hub 1320 includes a serial port to support the bar code scanner, an embedded 8-bit, 16-bit, or 32-bit processor, two radio devices, one for the local communication network, and another for the global communication network.

Before the power monitors 1318 and communication hub 1320 can be used, these devices need to be configured. In a particular embodiment, configuration involves associating a specific power monitor 1318 with a set of communication hubs 1320, and the outlet/equipment to which the power monitor 1318 is attached. A configuration tool is used to record and store this information. In a particular embodiment, the configuration tool uses a process involving four steps: (i) Identification, (ii) Device and power monitor 1318 association, (iii) Local Network Registration, and (iv) Router configuration. These steps are described in more detail below.

Identification involves collecting the unique identifier associated with each power monitor 1318 and storing these identifiers with the configuration tool. This identification step can be achieved in one of the several ways:

Manually read the unique bar code on each power monitor 1318 and record the identifiers in the configuration tool.

The configuration tool can include a bar code scanner, which is used to scan the bar code associated with each power monitor 1318.

The configuration tool can include a radio and may use the radio to directly communicate with the power monitor 1318. Once the power monitor 1318 is turned on (activated), the power monitor 1318 can send its unique identifier to the configuration tool.

The power monitor 1318 can send its identifier to the communication hub 1320, which then sends the identifier to the gateway 1330. The configuration tool can download the unique identifier from the gateway 1330 either through the network 108 or by connecting directly to the gateway 1330 through a USB or serial port.

Every power monitor 1318 can be associated with a device 1314 or power outlet to which the power monitor 1318 is attached. This association is used to determine which power monitor 1318 is used to measure the power of which device 1314. The process involves associating the identifier of a power monitor 1318 with a unique identifier of the device 1314 to which the power monitor 1318 is attached. This association can take place in one of several ways:

The configuration tool records the IP address of the device 1314, and associates the device IP address with the identifier of the power monitor 1318 being used to measure the power consumption of the device 1314.

The configuration tool can use a hardware identification number (such as the MAC ID) of the device 1314 to associate the device 1314 with the identifier of the power monitor 1318 being used to measure the power consumption of the device 1314.

The configuration tool can use an absolute location (X, Y, Z) of the device 1314 within a data center or a relative location (X, Y, Z) of the device 1314 to associate the device 1314 with the identifier of the power monitor 1318 being used to measure the power consumption of the device 1314.

The configuration tool can use relative placement information corresponding to a placement of the device 1314 within a specific location of a data center. For example, a server can be identified by the rack and the specific slot within the rack in which the server is placed. This relative placement information can be used to associate the device 1314 with the identifier of the power monitor 1318 being used to measure the power consumption of the device 1314.

The configuration tool uses an identifier (such as host name) assigned to each device 1314, and associates this identifier with the identifier of the power monitor 1318.

Local network registration in a particular embodiment involves creating a subnet that includes a set of power monitors 1318. This subnet creation involves using the configuration tool to assign a unique identifier (subnet address) to each local network. The configuration tool may also assign a unique name or location to each subnet.

Finally, each local network is associated with a primary communication hub 1320, which acts as a router and manager for the local network. Router (e.g., primary communication hub 1320) configuration takes place in one of the several ways in various embodiments:

The communication hub 1320 is pre-loaded with the identifiers of the associated power monitors 1318 and the corresponding local network identifier.

The configuration tool uses the global network to download the corresponding local network identifier, and the identification number of each associated power monitor 1318 to a communication hub 1320.

The configuration tool uses radio hardware to download the corresponding local network identifier, and associated power monitor 1318 identifiers to a communication hub 1320.

The communication hub includes displays and user interfacing elements (such as touch interfaces and buttons). An installer uses these elements to key in the local network identifier and the identifiers of power monitors that are part of the specific local network.

The initialization phase involves the formation of the network in which both local and global networks are initialized. The techniques for building the global network are described above in relation to building the WSN 110. The method used for initialization of the local network in a particular embodiment is described next.

Once a power monitor 1318 is turned on (activated), the power monitor 1318 tries to connect with a communication hub 1320 by sending beacons. A beacon is a data message sent via the wireless network. If there is no response from a communication hub 1320, possibly because the communication hub 1320 has not been turned on or the global network has not been formed, the power monitor 1318 can: 1) sleep for some pre-configured length of time, 2) try sending the beacon again, or 3) choose a channel (e.g., a particular radio frequency band) on which the power monitor 1318 can periodically request formation of the network.

If a communication hub 1320 is active and the global network has been formed, the communication hub 1320 can collect information related to the local networks that the communication hub 1320 needs to support. The communication hub 1320 can then monitor all channels on its secondary radio for request beacons from power monitors 1318. Once the communication hub 1320 receives a request beacon from a power monitor 1318, the communication hub 1320 can check its list of power monitors 1318 that the communication hub 1320 needs to support. If the requesting power monitor 1318 is on the list of power monitors 1318 that the communication hub 1320 needs to support, the request from the power monitor 1318 is verified. If the request is verified, the communication hub 1320 can send a confirm message to the requesting power monitor 1318. Once the communication hub 1320 receives an acknowledgement from the requesting power monitor 1318, a confirmation message is sent back to a network manager, which records the formation of the local network.

Another possible way in which a power monitor can become part of a local network is by sending request beacons to other power monitors that are already part of the network. In this approach, a power monitor sends beacons on a fixed number of channels. The power monitors that are already part of the local network monitor these channels for beacon messages. Once they receive request beacons, they forward the beacons to the associated communication hub. The communication hub responds to the requesting power monitor.

The various embodiments described herein provide a universal power monitoring system that allows for monitoring of power to individual electrical loads. Although various embodiments have application in several markets, a primary application is to measure the power usage of servers, routers, storage equipment, etc. within data centers. Certainly, the ability to accurately monitor power consumption at the server level can significantly reduce the frequency of power problems associated with power needs that exceed budgeted power. The various embodiments also enable data center operators to adequately budget for per-cabinet power usage.

The basic functionality of the various embodiments may be broken down into three primary parts: (a) per plug power usage data acquisition, (b) per cabinet data aggregation, and (c) data transmission. The idea for acquiring per-equipment power usage data is to augment the power cord to the load with a power monitoring capability. This is accomplished through the use of a power-sensing device that has compatible male and female power connectors, such as the power monitor 1318 as described above. It is envisioned that each device to be monitored will be equipped with a power monitor 1318.

By measuring power usage data at the plug-level, the power monitor 1318 and communication hub 1320 provides the ability to aggregate data to provide cabinet level metrics. Each power monitor 1318 within a cabinet shall communicate its data to a local communication hub 1320. The communication hub 1320 may support power monitors 1318 in multiple cabinets. The communication hub 1320 bridges the wireless communications of the per plug power monitor 1318 to the wireless network. The communication hub 1320 also reports a power monitor 1318 configuration to the server. This configuration information contains a mapping of power monitors 1318 to outlets on the rack PDU. The communication hub 1320 can have a display that provides visualization for total current, total kW, max current, and historical charting. The data is provided at phase-level per strip, per rack, in order to facilitate power load balancing. Each communication hub 1320 can join the wireless network and report the measured and computed power data captured from each power monitor 1318 via the WSN.

Figure 11:
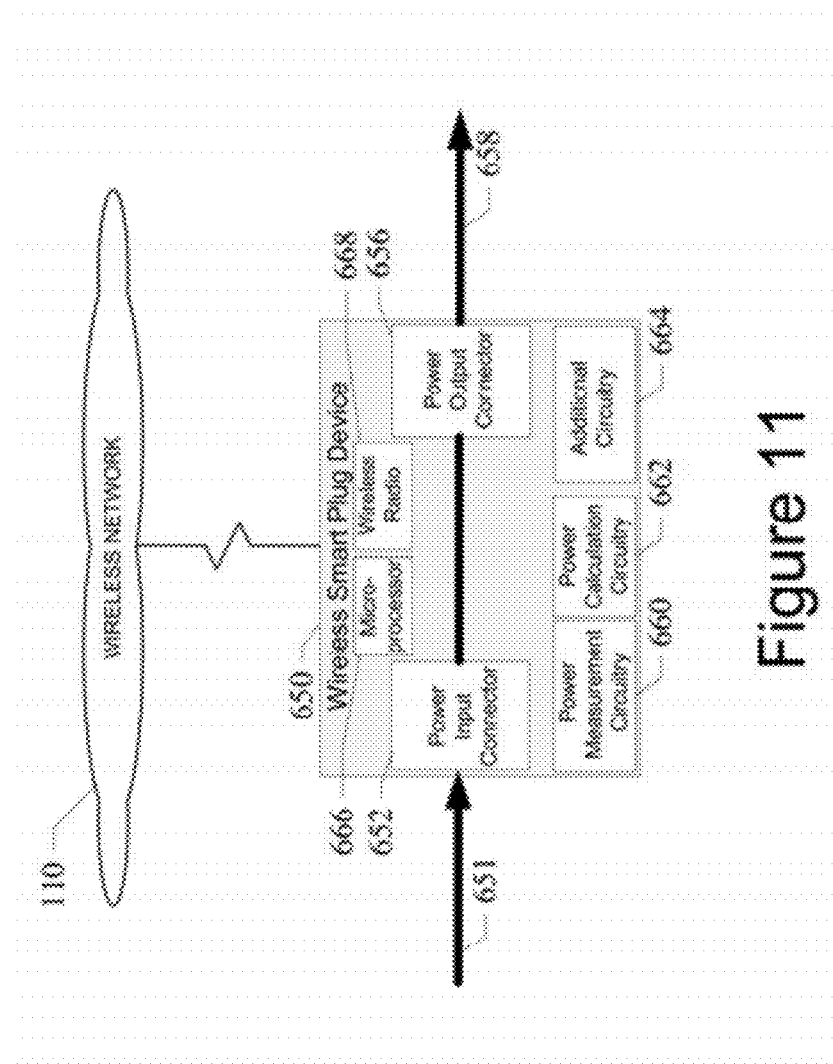
FIG. 11 illustrates an example embodiment of a wireless smart plug (WSP) device that can operate in a wireless mesh network of various embodiments.
Figure 12:
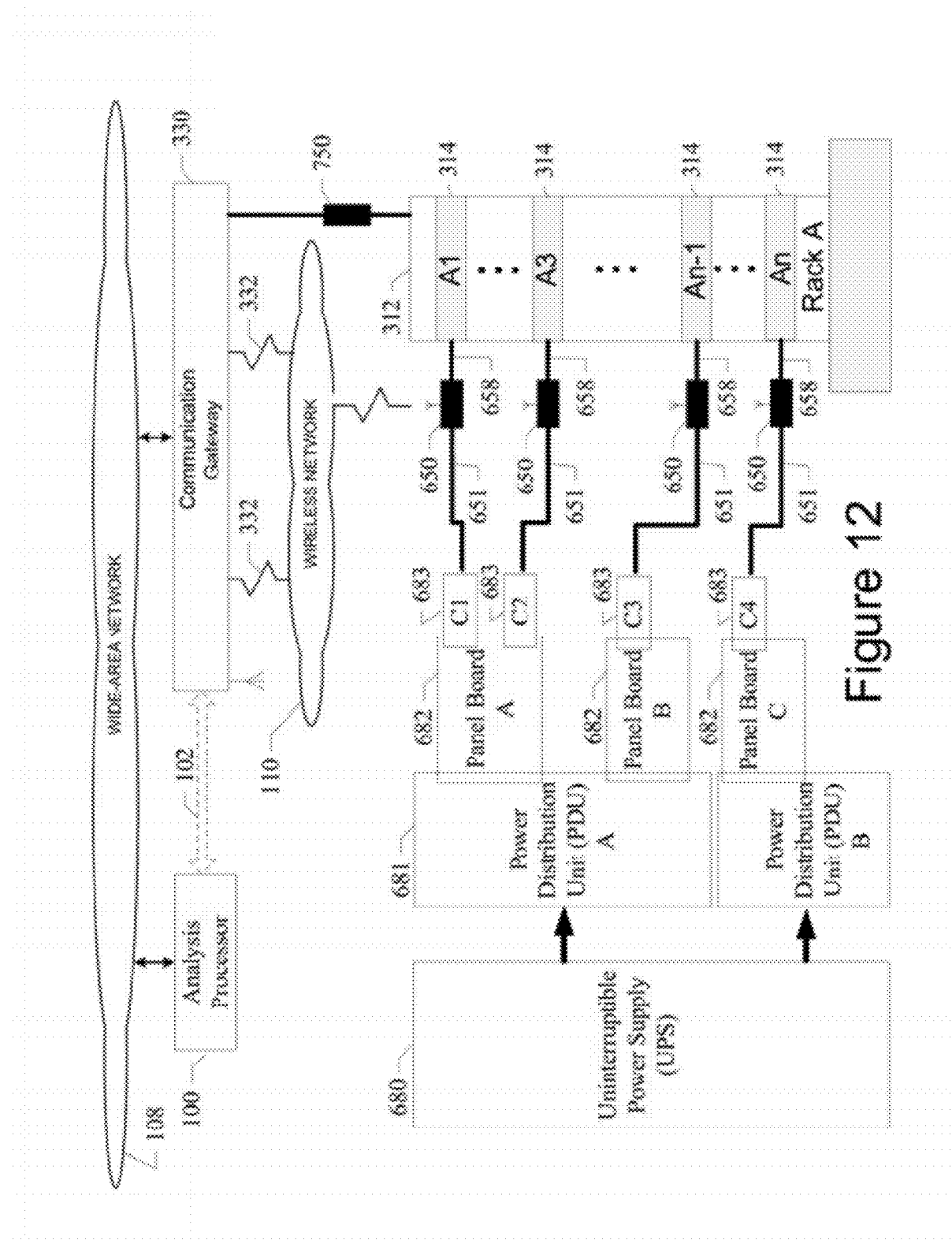
FIG. 12 illustrates a sample data center configurations of particular embodiment that includes a set of racks that support stacked sets of electronic equipment, the power consumption of the electronic equipment being monitored by wireless smart plug (WSP) devices, which communicate with a communication gateway and analysis processor via a wireless sensor network.

FIG. 11 illustrates another example embodiment of a wireless smart plug (WSP) device 650 that can operate in a wireless sensor network of various embodiments. The WSP devices 650 can also be denoted as power monitors (PMs) or Smart Plugs (SPs). The details of the WSP 650 in an example embodiment are described below. In a typical data center as shown in FIG. 12, electronic devices 314 (e.g., servers) residing in racks 312 or standalone can be powered via electrical power cords or cables that attach to the electronic device 314 on one side and to a WSP 650 on another side. As described above, the RPDU 320 of an example embodiment is connected to an electrical power source via electrical cable 322. In a similar manner, the WSP 650 is connected to an electrical power source via electrical cable or cord 651. As shown in FIG. 12, the electrical power source can be driven by an uninterruptible power supply (UPS) 680, which provides electrical power to a plurality of power distribution units (PDUs) 681. Each PDU 681 can include a plurality of panel boards 682, which can each include a plurality of electrical circuits 683. Each electrical circuit 683 can provide specific power requirements for any of the WSPs 650 to which the electrical circuits 682 are electrically connected. In an example embodiment, each of the PDUs 681, each of the panel boards 682, and each of the electrical circuits 683 can include a unique identifier, which can be configurably associated the WSP 650 to which the particular PDU 681, panel board 682, and electrical circuit 683 is electrically connected. This unique identifier can be implemented as label, barcode, or a series/register of configurable digital bits or configurable jumper leads provided on the PDU 681, panel board 682, or electrical circuit 683. These unique identifiers are used in the configuration phase, described in more detail below, to configurably associate each WSP 650 to the particular PDU 681, panel board 682, and electrical circuit 683 to which the WSP 650 is electrically connected.

Figure 13:
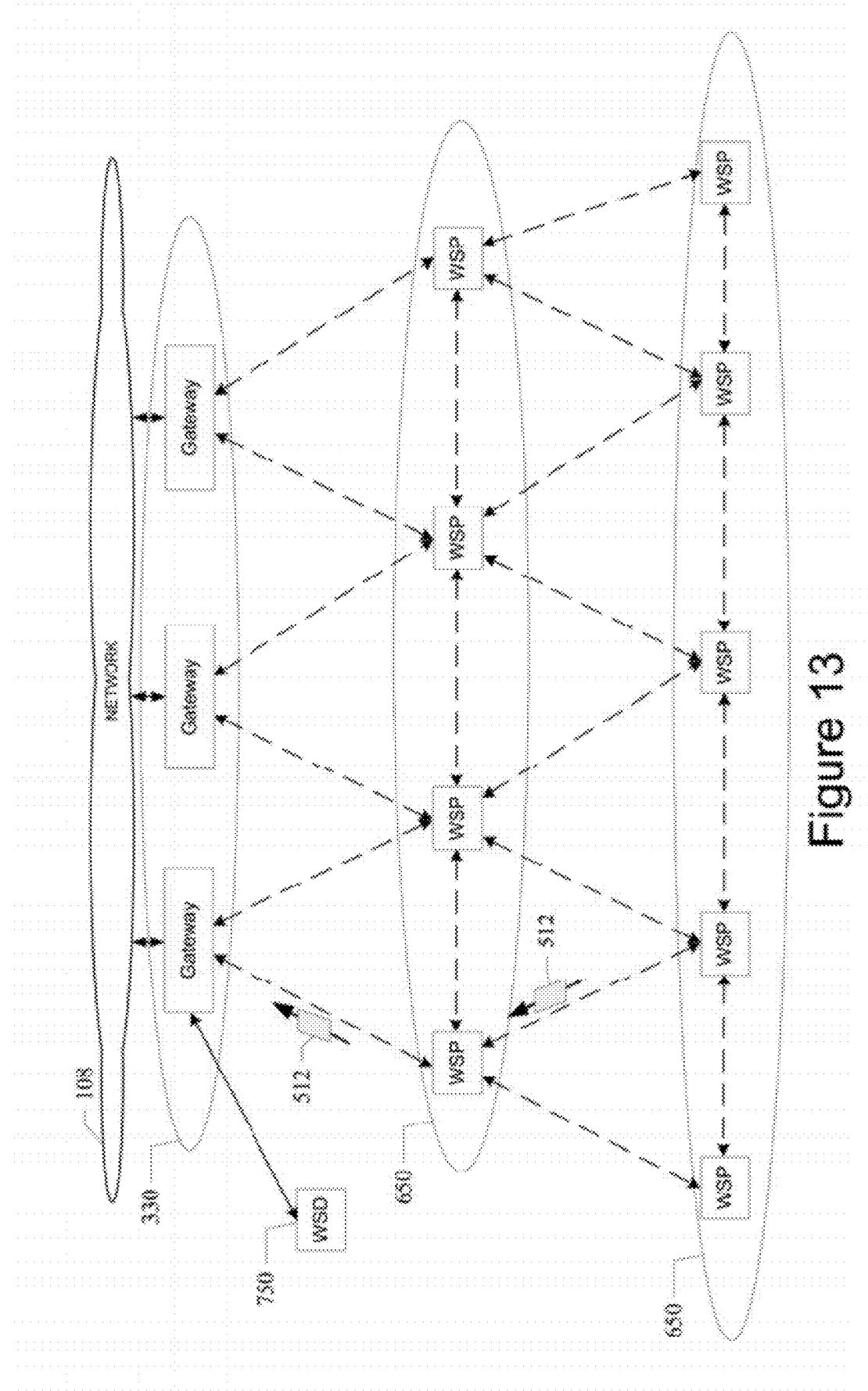
FIG. 13 illustrates a layout of an example data center in which an array of WSPs have been deployed.

In an alternative embodiment as shown in FIGS. 12 and 13, wired sensor devices (WSDs) 750 or other sources of system data can also be deployed with the WSPs 650 for collecting system information, including power consumption information, which can be communicated along with the data from the wireless sensor devices via gateway 330 to an analysis processor 100 for management of capacity and consumption of electrical power within a data center.

Referring again to FIG. 11, the components of a WSP 650 of an example embodiment are shown to include a power input connector or electrical circuit 683 interface 652, a power output connector or electrical device 314 interface 656, one or more low cost microprocessors 666, a wireless radio 668, power measurement circuitry 660, power calculation circuitry 662, and additional circuitry 664. The WSP 650 includes circuitry and functionality to operate as a wireless node 112 of a WSN 110 as described above. In this manner, the WSP 650 can transmit and receive data wirelessly from other WSPs 650 and to/from gateway 330. A WSP 650 can be connected to an electrical power source provided by an electrical circuit 683 via electrical power cord or cable 651 and power input connector 652. A WSP 650 can also be connected to an electrical device 314 via electrical power cord or cable 658 and power output connector 656. The WSP 650, of a particular embodiment, includes power measurement circuitry for sampling and measuring the electrical power consumed by electrical devices 314 connected to the WSP 650. The WSP 650 also includes power calculation circuitry for converting the sampled and measured electrical power consumption measurements into power consumption data, which can be transferred to the communication gateway 330 and analysis processor 100 via wireless network 110. Upon connection, the WSP 650 uses its power measurement circuitry to measure the electrical power consumed by the electronic devices 314 to which the WSP 650 is connected. The electrical power usage/consumption data can be retained in a memory of the WSP 650 and ultimately sent wirelessly from the WSP 650 to the communication gateway 330 and analysis processor 100 via wireless network 110.

Referring now to FIG. 13, a particular embodiment can use a multi-tier wireless communication architecture for collecting and distributing power monitoring and control information. As shown in FIG. 13, a wireless communication network includes an array of WSP 650 wireless nodes. In a particular embodiment, the wireless communication network is a multi-hop mesh network that integrates a plurality of WSPs 650 with one or more gateways 330. An example embodiment is shown in FIG. 13. The wireless communication network is used to distribute system data that is collected by the WSPs 650 or other wireless sensor devices that may be in wireless data communication with the WSPs 650. As shown in FIG. 13, a plurality of WSPs 650 forms a wireless communication network with one or more gateways 330. The wireless communication network is used to transfer system information, including electrical power usage, consumption, and control information to/from the gateways 330 and the analysis processor 100 in a multi-tiered wireless communication architecture.

In an example embodiment, such as the example embodiment shown in FIG. 13, data transfer between network nodes (e.g., WSPs 650 and gateways 330) takes place in two general phases: a data collection phase and a data communication phase. In the data collection phase, the WSPs 650 collect power related information (system power data) periodically from the electronic devices 314 and the particular PDU 681, panel board 682, and electrical circuit 683 to which the WSP 650 is electrically connected. The WSPs 650 may be able to aggregate some of this system power data locally. At pre-configured intervals or upon request from another network device, the WSPs 650 can send the aggregated system power data to a gateway 330 via the wireless communication network in the data communication phase. In the data communication phase, the WSPs 650 can send the collected system power data to the gateway 330 using the wireless communication network described above. An example of the routing of the system power data is shown in FIG. 13 as a routing of a network data message 512 through the wireless communication network as described herein.

FIG. 13 illustrates a layout of an example data center in which an example array of WSPs 650 has been deployed. A typical deployment can include an array of networked devices (including WSPs 650 and gateways 330) in a distributed network architecture. In a particular example embodiment, the system described herein can include several kinds of devices, including wireless sensor devices, RPDUs 320, wireless bridge devices (WBD) 310, WSPs 650, gateways 330, routers, controllers, and the like that are distributed in the data center. Gateways 330 can connect the WSPs 650 to a wide-area network 108, such as an Internet Protocol (IP) network including the Internet, via WSPs 650 and gateways 330. Gateways 330 typically have communication paths to all sensing and control devices in a particular system. Gateways 330 can send commands, status information, or data center relevant information to the other network devices (e.g., WSPs 650).

In a particular embodiment, an example system can include a centralized software system, called the Analysis Processor 100 (shown in FIG. 1), which stores all of the sensing, control, and status information that is forwarded to the gateways 330 by the other system devices (e.g., WSPs 650). The Analysis Processor 100 is primarily a repository of information and system-wide data processing for the system. In some embodiments, the Analysis Processor 100 can also control the electrical power needs of the electronic devices 314 in a particular facility in order to affect the overall power consumption of the facility. The WSPs 650 and gateways 330, denoted generally herein as the network devices, cooperate to establish a mesh data communications network that provides connectivity among the network devices.

As described above, WSPs 650 can be implemented as wireless sensor devices, which include the capability to interface with the wireless communication network 110 as described herein. As such, the WSPs 650 can be considered wireless sensor devices and nodes in the wireless network 110. Each of the wireless sensor devices, including WSPs 650, can be configured to sense various system conditions, such as electrical power conditions. As such, the WSPs 650 can sense and monitor electrical power usage/consumption information (including electrical current, voltage, power, power factor, energy, etc.) and the like from the particular electrical devices 314, PDU 681, panel board 682, and electrical circuit 683 to which the WSP 650 is electrically connected. At a predetermined and configurable time interval, WSPs 650 can measure the system conditions at each sensor location and retain the system power data measurements along with a timestamp associated with each system power data measurement. Using the wireless data network 110, the WSPs 650 can transmit time-stamped system power data along with an identifier of corresponding electrical devices 314, PDU 681, panel board 682, and electrical circuit 683 from which the power data was collected. This system power data can be sent to the analysis processor 100 for processing. The time-stamped system data can be sent to the analysis processor 100 via a pathway of nodes in wireless network 110, gateway 330, and wide-area network 108. In this manner, the analysis processor 100 can collect the time-stamped system power data from each of the WSPs 650 connected to electrical devices 314 in racks 312. It will be understood by those of ordinary skill in the art upon reading this patent disclosure that an arbitrary number of WSPs 650 can be connected to the electrical devices 314 in racks 312 in arbitrary positions in a particular datacenter. In general, the greater number of wireless sensor devices increases the ability for the system to detect more subtle changes in the system conditions within the data center. The analysis processor 100 can use the system power data to monitor and control operation of the plurality of electronic devices 314 in the facility.

Referring to again FIGS. 12 and 13, each WSP 650 can use the multi-hop mesh network (such as wireless network 110) to send the system power data to the analysis processor 100 via gateway 330 for data processing. In a particular embodiment, each WSP 650 can operate in the following way to measure and communicate electrical power usage information.

Each WSP 650 is capable of sampling electrical power usage/consumption data from the corresponding electrical devices 314, PDU 681, panel board 682, and electrical circuit 683 to which the WSP 650 is connected. After sampling the data, the WSP 650 can convert the sampled measurements to power capacity/usage/consumption data, generally denoted system power data, which can be locally stored and/or transferred to the analysis processor 100 via gateway 330 and the wireless communication network 110. In this manner, the WSP 650 can perform among the following power measurements and system power data generation. In an example embodiment, the WSP 650 can:

- Identify each of the corresponding electrical devices 314, PDU 681, panel board 682, and electrical circuit 683 to which the WSP 650 is connected using a unique identifier for each device;
- Measure electrical power at each of the corresponding electrical devices 314, PDU 681, panel board 682, and electrical circuit 683 to which the WSP 650 is connected;
- Measure instantaneous power (watts);
- Measure and store the highest (max) and lowest (min) power (watts);
- Measure and store volts per phase, current per phase and power factor;
- Calculate an average power (watts), peak power (watts), low power (watts), average volts per phase, average current per phase, and average power factor; and
- Aggregate these metrics over time t, where t is configurable.

The WSP 650 may locally store the measured and/or calculated power capacity/usage/consumption data, generally denoted system power data, in long-term data storage on the WSP 650 device itself The WSP 650 may also locally store the corresponding device identifiers. Periodically, each WSP 650 can send the measured and converted system power data and corresponding device identifiers to the analysis processor 100 via gateway 330 and the wireless communication network 110.

The analysis processor 100 processes the system power data received from each of the wireless sensor devices in a wireless network 110 of a particular facility. As described herein, the wireless sensor devices can be a combination of WSPs 650, RPDUs 320, WBDs 310, PMs, SPs, and/or other wireless sensor devices. In one embodiment, the analysis processor 100 can be implemented as a power capacity management system running on a server computer. The analysis processor 100 can collect system power data from the wireless sensor devices, and automatically calculate power usage and available electrical capacity in the system of a particular facility. This computed usage and capacity data can be used to control the operation and placement of electrical devices in the facility. In an example embodiment, the analysis processor 100 can use the following steps to achieve usage, capacity, and placement control of electrical devices in a facility, such as a data center:

- Divide the data Center into a set of PDUs 681 and associate the maximum and minimum available capacity based upon a particular PDU's rated design electrical capacity and desired connected operating load;
- Divide PDUs 681 into a set of panel boards 682 and associate the maximum and minimum available capacity for each panel board 682 based upon a particular panel board's rated design electrical capacity and desired connected operating load;
- Divide each panel board 682 into a set of electrical circuits 683 and associate the maximum and minimum available capacity for each electrical circuit 683 based, upon a particular electrical circuit's rated design electrical capacity and desired connected operating load; and
- Calculate circuit capacity usage metrics for each electrical circuit 683, every time system power data is received from a wireless sensor device sensing power data from the particular electrical circuit 683:
  - a. Receive minimum, maximum and average electrical current data from each reporting wireless sensor device, the minimum, maximum and average electrical current data corresponding to a particular monitored electrical device 314 associated with the reporting wireless sensor device;
  - b. Compute the Minimum capacity usage. The Minimum capacity usage is equal to the sum of the minimum electrical current data from each monitored electrical device 314;
  - c. Compute the Maximum capacity usage. The Maximum capacity usage is equal to the sum of the maximum electrical current data from each monitored electrical device 314;
  - d. Compute the Average capacity usage. The Average capacity usage is equal to the sum of the average electrical current data from each monitored electrical device 314; and
  - e. Compute the Left over capacity. The Left over capacity is equal to the Maximum available capacity less the Maximum capacity usage.
- Determine where to place an electrical device 314 in existing racks 312 that are being electrically powered by existing connected electrical circuits:
  - a. Determine the maximum load required for the electrical device 314 being placed, either by reading the faceplate value on the electrical device 314 or by measuring the maximum load of the electrical device 314 while running the desired Operating System (OS) and an industry benchmark load while connected to a WSP 650;
  - b. Obtain the available capacity for each PDU 681 in the facility by summing the Left over capacity for each electrical circuit 683 fed by a particular PDU 681;
  - c. Calculate PDU Left over capacity for each PDU 681. The PDU Left over capacity is the available capacity for a particular PDU 681 less the maximum load required by the electrical device 314 being placed; and
  - d. Determine the best placement for the electrical device 314 in the facility by using any one of several configurable methods:
    - i. Choose the PDU 681, for use with the electrical device 314 being placed, which has the smallest PDU left over capacity and has an available physical mounting space required for the type of electrical device 314 being placed in the equipment rack 312. (Best fit);
    - ii. Choose the first PDU 681 that has sufficient PDU left over capacity for use with the electrical device 314 being placed and has an available physical mounting space required for the type of electrical device 314 being placed in the equipment rack 312. (First fit);
    - iii. Choose the first PDU 681 that has sufficient PDU left over capacity for use with the electrical device 314 being placed and has an available physical mounting space required for the type of electrical device 314 being placed in the equipment rack 312 and is located in the coolest racks. (Approximation for cooling resource); or
    - iv. Choose the first PDU 681 that has sufficient PDU left over capacity for use with the electrical device 314 being placed and has an available physical mounting space required for the type of electrical device 314 being placed in the equipment rack 312 and has the most under floor pressure. (Another approximation for cooling).

Determine the effect when an electrical device 314, being electrically powered by existing connected electrical circuits, is removed from an existing equipment rack 312:
  a. Obtain a value corresponding to the maximum electrical current required for the electrical device 314 being removed;
  b. Obtain a value corresponding to the maximum available capacity for the electrical circuit 683 supplying electrical power to the electrical device 314 being removed;
  c. Remove the electrical device 314; and
  d. Recalculate a new left-over circuit capacity for the electrical circuit 683 supplying electrical power to the electrical device 314 being removed by subtracting the value corresponding to the maximum electrical current required for the electrical device 314 being removed from the value corresponding to the maximum available capacity for the electrical circuit 683 supplying electrical power to the electrical device 314 being removed.

Provide facility electrical power monitoring and control necessary to migrate workloads off lightly utilized electrical devices 314 to other electrical devices 314 with available capacity, thereby allowing some of the electrical devices 314 in the facility to be powered down or placed in a deep sleep mode to conserve energy consumed by electrical devices 314 running at idle:
  a. Obtain or calculate the PDU left over capacity for each PDU 681. Determine where additional electrical power is available in the data center based on the PDU Left over capacity for each PDU 681;
  b. Obtain or calculate the circuit left over capacity for each electrical circuit 683 that provides electrical power to particular equipment racks 312;
  c. Obtain or calculate the rack left over capacity by summing the circuit left over capacities of the electrical circuits 683 that provide electrical power to particular equipment racks 312. Determine where additional electrical power is available in particular equipment racks 312 of the data center based on the rack left over capacities for each of the equipment racks 312 of the facility;
  d. Obtain or calculate the maximum electrical load required for each electrical device 314 in each of the equipment racks 312 of the facility. The electrical load required for each of the electrical devices 314 can be determined based on the dynamic electrical power usage and consumption information being supplied in real time to the analysis processor 100 by the deployed wireless sensors 112. The electrical load required for each of the electrical devices 314 can be used to determine the electrical loading levels of each of the electrical devices 314 and to determine which of the electrical devices 314 are most lightly loaded based on real time information from the WSN 110. In one embodiment, a lightly loaded electrical device can be an electrical device that is using no more that 50% of the electrical device's maximum available electrical power capacity;
  e. Determine which particular equipment racks 312 have: 1) additional available electrical power, 2) the coolest sub-floor temperatures, and 3) the most under floor pressure (e.g., under floor pressure can be used as an approximation of cooling resources). This can be determined based on the dynamic electrical power usage and consumption information, the real time temperature information, and the real time pressure information being supplied in real time to the analysis processor 100 by the deployed wireless sensors 112. The real time temperature information and the real time pressure information can be included in a set of environmental data that can be measured and conveyed to the analysis processor 100 by the deployed wireless sensors 112;
  f. Based on the rack left over capacities, the electrical loading levels of each of the electrical devices 314 in particular equipment racks 312, and the temperatures and pressures corresponding to each of the equipment racks 312, determine which of the equipment racks 312 are most lightly loaded, and determine which of the electrical devices 314 are the most lightly loaded. Based on the rack 312 and electrical device 314 loading levels, identify the most lightly loaded electrical devices 314, for which their workloads can be consolidated while still satisfying the maximum electrical loading constraints imposed on the PDUs 681, the electrical circuits 683, the electrical devices 314, and the cooling constraints imposed on the equipment racks 312; and
  g. Dynamically migrate the workloads from the identified lightly loaded electrical devices 314 to other electrical devices 314 to allow powering down these identified lightly loaded electrical devices 314 or placing these lightly loaded electrical devices 314 in a deep sleep or idle mode to save energy and thereby increase overall data center electrical equipment utilization with increased efficiency. The analysis processor 100 can be in data communication with each of the electrical devices 314 using conventional means. For example, the analysis processor 100 can communicate with each of the electrical devices 314 using, for example, an Internet Protocol (IP) data/instruction transfer. In this manner, the analysis processor 100 can dynamically command any one of the electrical devices 314 to migrate its workload to another electrical device 314. The analysis processor 100 can also use this method to dynamically command any one of the electrical devices 314 to power down or enter an idle or sleep mode (e.g., deactivate). As such, the analysis processor 100 can dynamically command any one of the electrical devices 314 to deactivate.

In various example embodiments, an apparatus and method for managing power capacity in data centers using a wireless sensor network is described herein. As described herein, the various embodiments enable several advantages. These advantages are summarized below:

The various embodiments provide a mechanism for separating the power measurement infrastructure from the communication infrastructure, and for combining the two infrastructure components in several ways. This enables aggregation of power measurement readings and their communication through a single network infrastructure.

The various embodiments provide a low cost method for collecting data from standard RPDUs, WSPs, WBDs, PMs, SPs, and/or other wireless sensor devices or power distribution units.

The various embodiments use a self-discovery mechanism to learn information about the RPDUs, WSPs, WBDs, PMs, SPs, and/or other wireless sensor devices or power distribution units.

The various embodiments use a low cost multi-hop wireless network infrastructure for data distribution, which makes the power measurement infrastructure easier to deploy and integrate.

The various embodiments use a multi-level wireless network to collect power information and distribute the information to different nodes.

The various embodiments eliminate the need to wire the communication infrastructure.

The various embodiments provide techniques for configuring the power and communication network so that the apparatus can be used to provide power usage information at multiple levels.

Figure 14:
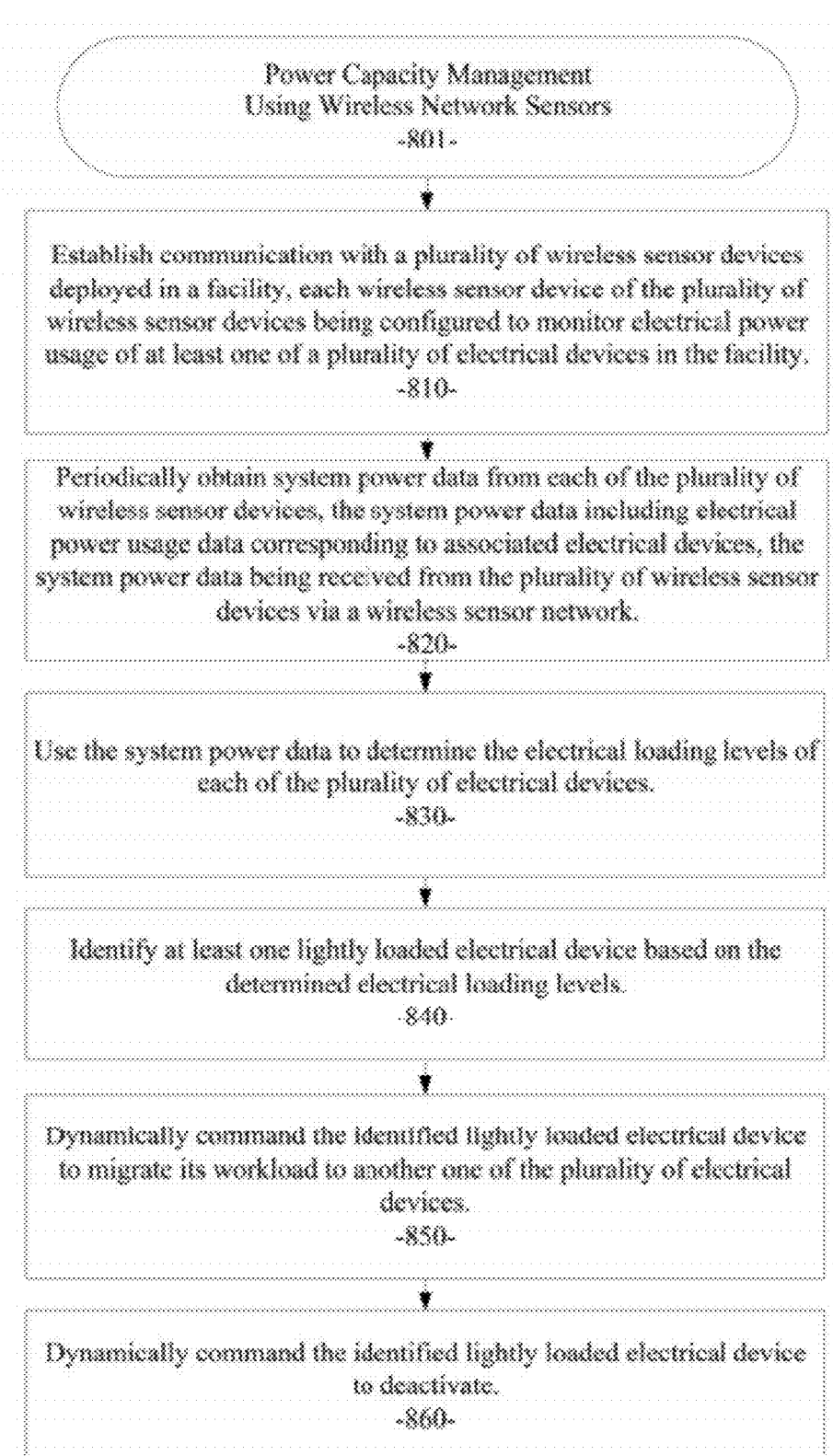
FIG. 14 is a flow diagram illustrating the basic processing flow for a particular embodiment.

FIG. 14 is a flow diagram illustrating the basic processing flow 801 for a particular embodiment. As shown, an example embodiment includes: establishing communication with a plurality of wireless sensor devices deployed in a facility, each wireless sensor device of the plurality of wireless sensor devices being configured to monitor electrical power usage of at least one of a plurality of electrical devices in the facility (processing block 810); periodically obtaining system power data from each of the plurality of wireless sensor devices, the system power data including electrical power usage data corresponding to associated electrical devices, the system power data being received from the plurality of wireless sensor devices via a wireless sensor network (processing block 820); using the system power data to determine the electrical loading levels of each of the plurality of electrical devices (processing block 830); identifying at least one lightly loaded electrical device based on the determined electrical loading levels (processing block 840); dynamically commanding the identified lightly loaded electrical device to migrate its workload to another one of the plurality of electrical devices (processing block 850); and dynamically commanding the identified lightly loaded electrical device to deactivate (processing block 860).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or embodying a set of instructions for execution by the machine and that cause the machine to perform any one or more of the methodologies described herein. The term "machine-readable medium" shall accordingly be taken to include, but not be limited to, solid-state memories, optical media, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R.§1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for managing power capacity in data centers using a wireless sensor network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A method comprising:
   establishing communication with a plurality of wireless sensor devices deployed in a facility, each wireless sensor device of the plurality of wireless sensor devices being configured to monitor electrical power usage of at least one of a plurality of electrical devices in the facility;
   periodically obtaining system power data from each of the plurality of wireless sensor devices, the system power data including electrical power usage data corresponding to associated electrical devices, the system power data being received from the plurality of wireless sensor devices via a wireless sensor network;
   using the system power data to determine the electrical loading levels of each of the plurality of electrical devices;
   identifying at least one lightly loaded electrical device based on the determined electrical loading levels;
   dynamically commanding, by use of a processor, the identified lightly loaded electrical device to migrate its workload to another one of the plurality of electrical devices, the dynamic commanding including sending a command in a message between nodes of the wireless sensor network by transiting through at least one intermediate node of the wireless sensor network; and
   dynamically commanding, by use of the processor, the identified lightly loaded electrical device to deactivate.

2. The method as claimed in claim 1 wherein the system power data includes voltage, electrical current, power, power factor, and energy data.

3. The method as claimed in claim 1 wherein the system power data being received by an analysis processor via a gateway and the wireless sensor network.

4. The method as claimed in claim 1 wherein determining the electrical loading levels of each of the plurality of electrical devices includes determining an available electrical capacity of at least one power distribution unit (PDU).

5. The method as claimed in claim 1 wherein determining the electrical loading levels of each of the plurality of electrical devices includes determining circuit capacity usage metrics for each of a plurality of electrical circuits.

6. The method as claimed in claim 1 including establishing communication with at least one wired sensor device deployed in the facility, the wired sensor device being configured to monitor electrical power usage of at least one of the plurality of electrical devices in the facility, the system power data including data provided by the wired sensor device.

7. An article of manufacture comprising a non-transitory machine-readable storage medium having machine executable instructions embedded thereon, which when executed by a machine, cause the machine to:
   establish communication with a plurality of wireless sensor devices deployed in a facility, each wireless sensor device of the plurality of wireless sensor devices being configured to monitor electrical power usage of at least one of a plurality of electrical devices in the facility;
   periodically obtain system power data from each of the plurality of wireless sensor devices, the system power data including electrical power usage data corresponding to associated electrical devices, the system power data being received from the plurality of wireless sensor devices via a wireless sensor network;
   use the system power data to determine the electrical loading levels of each of the plurality of electrical devices;
   identify at least one lightly loaded electrical device based on the determined electrical loading levels;
   dynamically command the identified lightly loaded electrical device to migrate its workload to another one of the plurality of electrical devices, the dynamic commanding including sending a command in a message between nodes of the wireless sensor network by transiting through at least one intermediate node of the wireless sensor network; and
   dynamically command the identified lightly loaded electrical device to deactivate.

8. The article of manufacture as claimed in claim 7 wherein the system power data includes measured environmental data.

9. The article of manufacture as claimed in claim 7 wherein the system power data includes voltage, electrical current, power, power factor, and energy data.

10. The article of manufacture as claimed in claim 7 wherein the system power data being received by an analysis processor via a gateway and the wireless sensor network.

11. The article of manufacture as claimed in claim 7 being further configured to determine an available electrical capacity of at least one power distribution unit (PDU).

12. The article of manufacture as claimed in claim 7 being further configured to determine circuit capacity usage metrics for each of a plurality of electrical circuits.

13. The article of manufacture as claimed in claim 7 being further configured to establish communication with at least one wired sensor device deployed in the facility, the wired sensor device being configured to monitor electrical power usage of at least one of the plurality of electrical devices in the facility, the system power data including data provided by the wired sensor device.

14. A system comprising:
   an analysis processor in data communication via a wide-area network;
   a gateway in data communication via the wide-area network and a wireless sensor network; and
   a plurality of networked wireless sensor devices deployed in a facility, each wireless sensor device of the plurality of networked wireless sensor devices being configured to collect system power data including electrical power usage data corresponding to at least one of a plurality of electrical devices in the facility; each wireless sensor device being further configured to send the system power data to the gateway via the wireless sensor network; the analysis processor being configured to receive the system power data from the gateway and to use the system power data to determine the electrical loading levels of each of the plurality of electrical devices, identify at least one lightly loaded electrical device based on the determined electrical loading levels, dynamically command the identified lightly loaded electrical device to migrate its workload to another one of the plurality of electrical devices, the dynamic commanding including sending a command in a message between nodes of the wireless sensor network by transiting through at least one intermediate node of the wireless sensor network; and dynamically command the identified lightly loaded electrical device to deactivate.

15. The system as claimed in claim 14 wherein the system power data includes voltage, electrical current, power, power factor, and energy data.

16. The system as claimed in claim 14 being further configured to route the system power data to the analysis processor via the gateway and the wireless sensor network.

17. The system as claimed in claim 14 wherein being further configured to establish communication with at least one wired sensor device deployed in the facility, the wired sensor device being configured to monitor electrical power usage of at least one of the plurality of electrical devices in the facility, the system power data including data provided by the wired sensor device.

18. The system as claimed in claim 14 wherein the analysis processor being further configured to determine circuit capacity usage metrics for each of a plurality of electrical circuits.

* * * * *